INVENTORS
WARREN S. RAYNOR
KEITH A. BURGESS

MATERIAL HANDLING SYSTEM

Original Filed Dec. 11, 1964 18 Sheets-Sheet 2

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

MATERIAL HANDLING SYSTEM

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS

INVENTORS
WARREN S. RAYNOR
KEITH A. BURGESS 3,512,625
MATERIAL HANDLING SYSTEM

Warren S. Raynor, Port Hope, Ontario, and Keith A. Burgess, Cobourg, Ontario, Canada, assignors to Rex Chainbelt Inc., a corporation of Wisconsin Original application Dec. 11, 1964, Ser. No. 417,714, now Patent No. 3,448,867. Divided and this application Jan. 2, 1969, Ser. No. 804,726
Int. Cl. B65g 47/26
U.S. Cl. 198—31 8 Claims

ABSTRACT OF THE DISCLOSURE

An article accumulation and transfer apparatus especially useful in connection with a pallet loading system wherein articles are arranged in layers consisting of a number of rows of articles. Individual articles are received seriatim onto the infeed end of a driven conveyer and accumulated thereon in a row, then the row in conveyed, as a unit, to a transfer station where the row is transferred, again as a unit, from the driven conveyer by a transfer conveyer. Articles are prevented from entering the infeed end of the conveyer while a row is being conveyed to the transfer station.

This application is a division of my copending application Ser. No. 417,714, filed Dec. 11, 1964, now Pat. No. 3,448,867.

This invention relates to an article handling system, in which articles received in stacked superimposed layers are stacked, and articles received individually from a conveyor are formed into a stack of superimposed layers and discharged as a unit. More particularly, the present invention relates to an improved article accumulation and transfer apparatus for use in such an article handling system.

In the handling of articles of uniform size it is frequently desired to form the articles into stacks so that a number of the articles may be handled or transported simultaneously. When this is done, however, it is sometimes necessary to break down the stacks into the individual units and subsequently to reform the stack for further handling. Often the stacks are formed on pallets so that lift trucks may be used to handle or move the individual stacks. This is commonly practiced, for example, on loading docks of many plants such as dairies, bottling plants, or the like where crates or cases of empty bottles are received at the entrance to the plant in stacks of superimposed layers each containing a plurality of cases, which stacks must be broken down into the individual cases before they are conveyed into the plant for cleaning and subsequent filling. The individual cases of filled bottles are received in line from within a plant on a conveyer system and must be formed into stacks for subsequent handling and shipment.

It is an object of the present invention to provide an improved article accumulation and transfer apparatus for forming articles into rows, and transferring the rows as a unit to be formed into layers for stacking on a pallet.

Another object of the invention is to provide a material handling system including an improved pallet loading machine for receiving articles moving in line on a conveyer and forming the articles into stacks of superimposed layers to be transferred as a unit and deposited on a pallet for subsequent handling.

The foregoing and other objects are attained in an article handling system including a pallet unloader and a pallet loader in side-by-side relation with a pallet stacking and dispensing magazine disposed therebetween in position to receive pallets discharged from the pallet unloader and to dispense pallets to the pallet loader as required. The pallet unloader includes a transfer device for removing a stack of cartons from a pallet and transferring the stack as a unit to an unstacking platform where the cartons are unstacked from the bottom of the stack and discharged individually. The transfer device includes a vertically movable hoist having a pair of clamping arms for engaging opposed sides of the stack to lift and support the stack while it is being transferred from the receiving platform to the unstacking platform. At the unstacking platform the clamping arms release the stack and re-engage the stack at a point above the bottom layer to support all of the stack above the bottom layer. The unstacking platform is made up of a plurality of independently movable sections which may be moved downwardly and laterally to simultaneously lower cartons supported thereon away from the stack and move the cartons laterally from the remainder of the layer. The cartons so lowered are conveyed from beneath the stack to be discharged individually onto an off-bearing conveyor. Once the bottom layer is removed, all of the sections of the unstacking platform are moved to their raised position and the stack is lowered onto the platform and the cycle repeated until all of the layers have been removed.

The pallet loader employed in this system includes an improved accumulating and transfer apparatus having means for accumulating successive rows of a predetermined number of cartons, in line, and conveying the formed rows successively to a transfer station on depositing the row onto a transfer conveyer. The transfer conveyer moves the rows to a stacking platform where the individual rows are formed into layers. A straddle car assembly positioned over the stacking platform clamps opposed sides of a layer which has been formed and elevates it to permit subsequent layers to be formed thereunder. When a subsequent layer is formed, the prior formed layer is deposited on top of the subsequent layer and the clamping elements are moved down to engage and lift the bottom layer and the cycle is repeated until a stack is completed. Upon completion of the forming of a stack, the straddle car assembly moves laterally from the stacking area and deposits the stack, as a unit, onto a pallet automatically dispensed from the pallet stacking and dispensing magazine.

Other objects and advantages of the invention will be apparent from the following detailed specification and the accompanying drawings in which.

Figure 1:
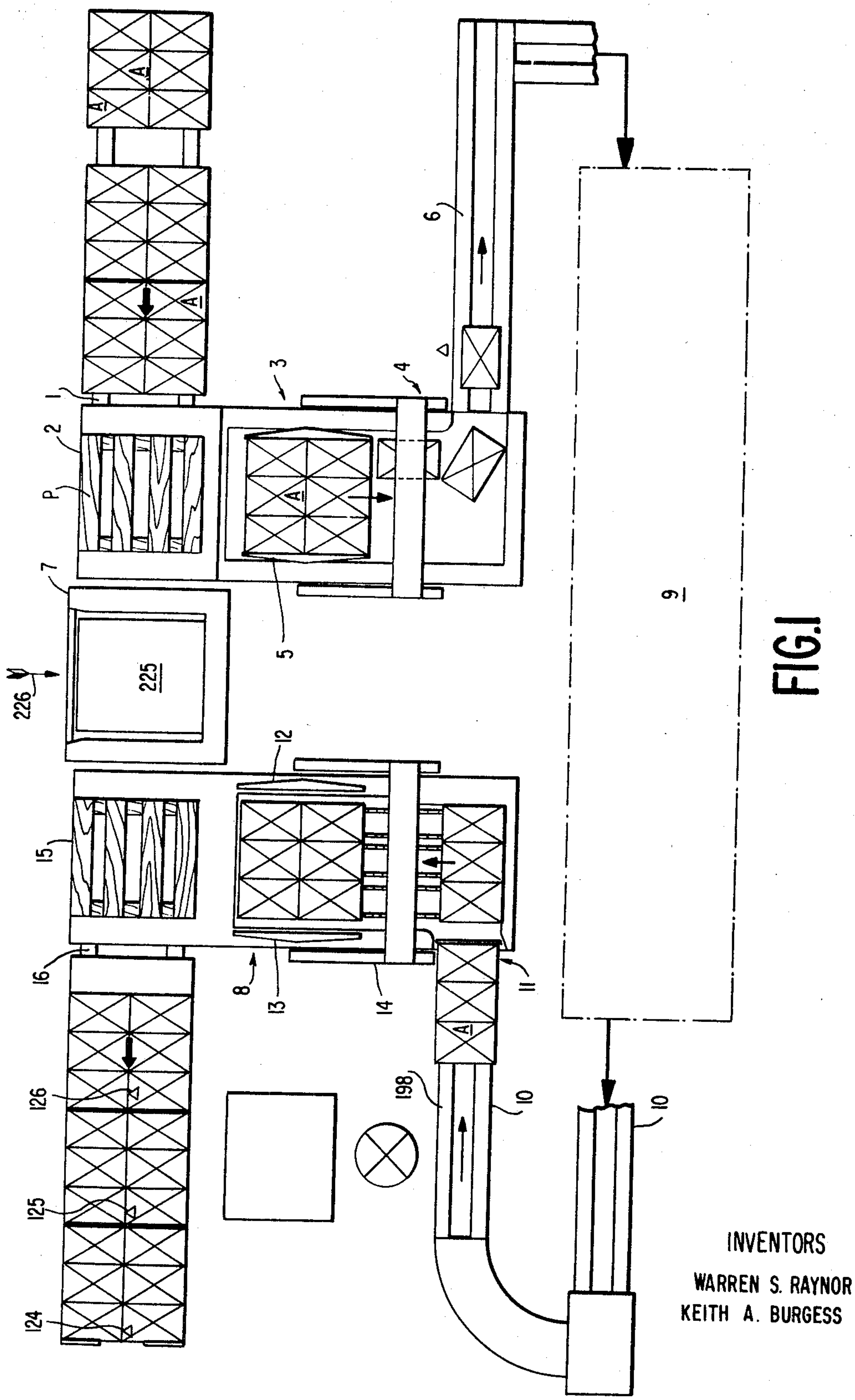
FIG. 1 is a plan view schematically showing a material handling system according to a present invention.
Figure 2:
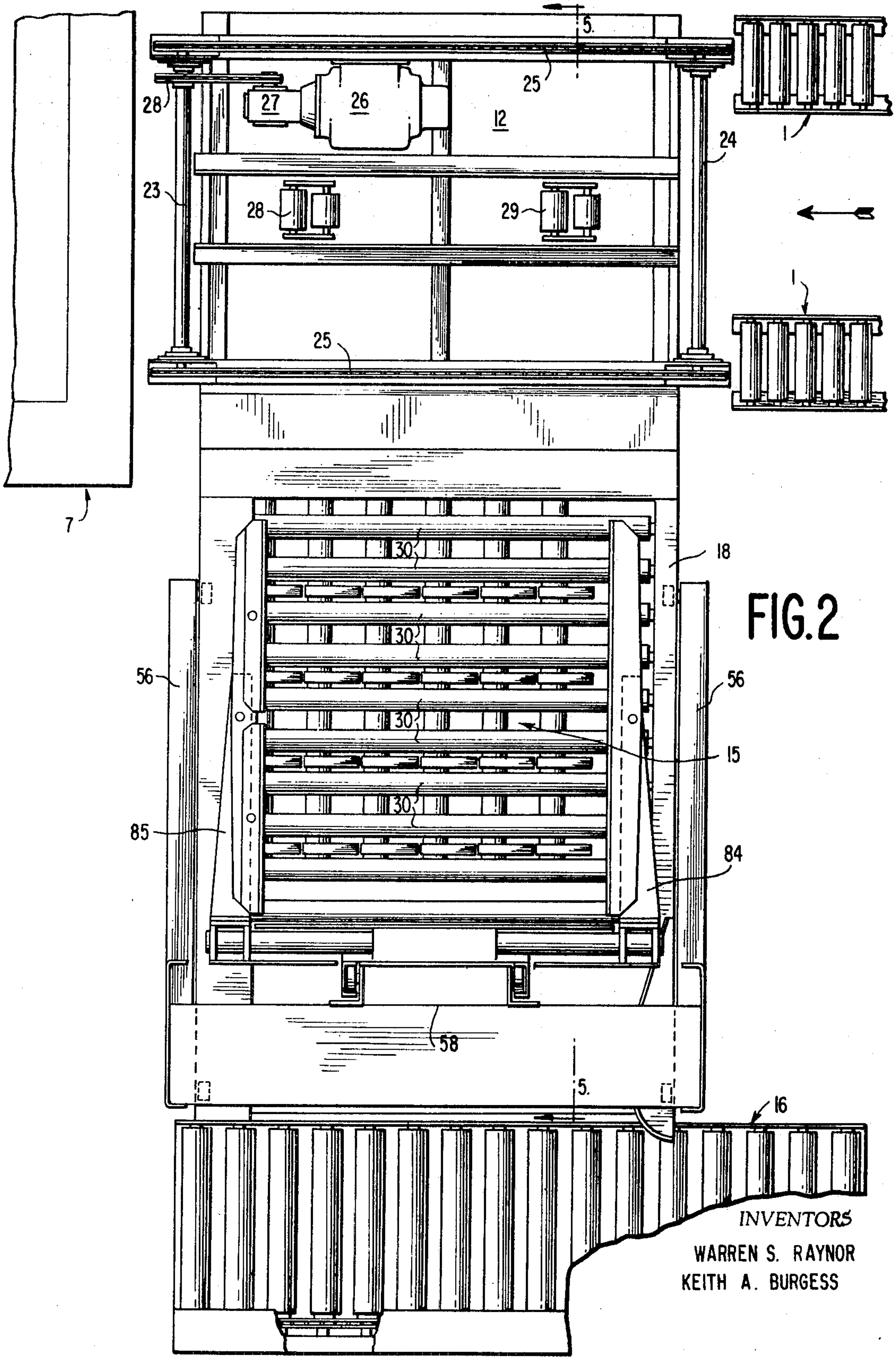
FIG. 2 is an enlarged plan view of the pallet unloader illustrated in FIG. 1.
Figure 3:
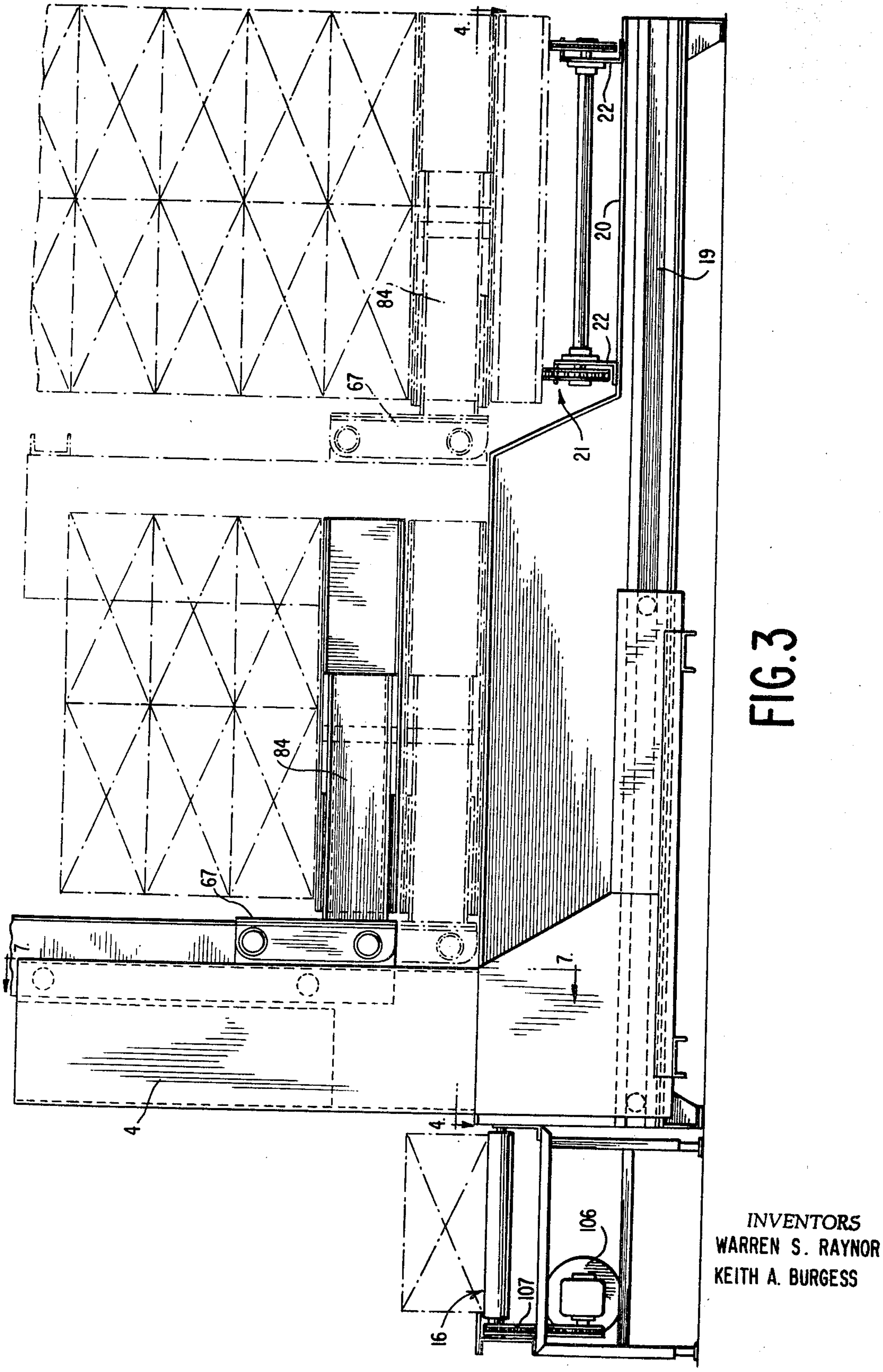
FIG. 3 is a side elevation view of the pallet unloader shown in FIG. 2, with the hoist mechanism illustrated in phantom in alternate positions.
Figure 11:
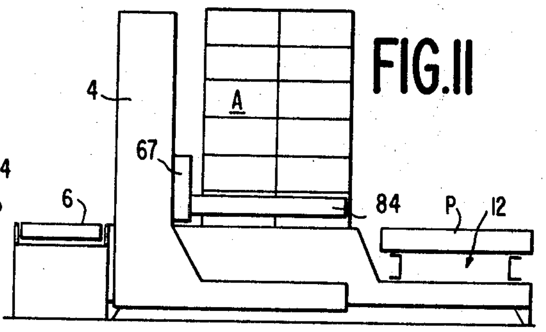
FIG. 11 is a view similar to FIG. 10 with the hoist shown depositing the stack on the load support platform.
Figure 12:
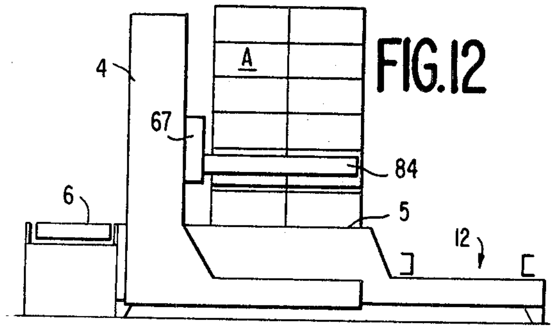
FIG. 12 is a view similar to FIG. 11 with the hoist shown engaging the layer of articles above the bottom layer.
Figure 13A:
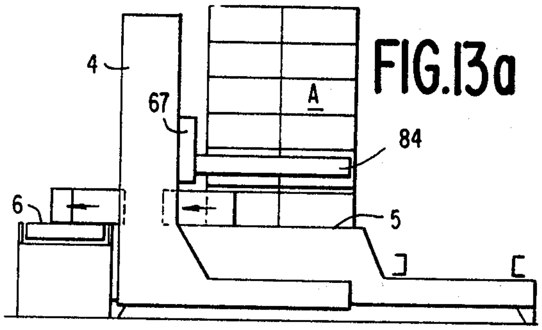
FIG. 13 is a view similar to FIG. 12 illustrating the bottom row of articles being moved from beneath the remainder of the stack supported by the clamping jaws.
Figure 13B:
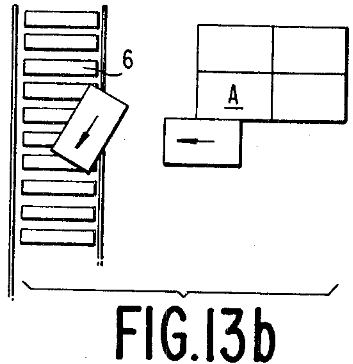
Figure 13C:
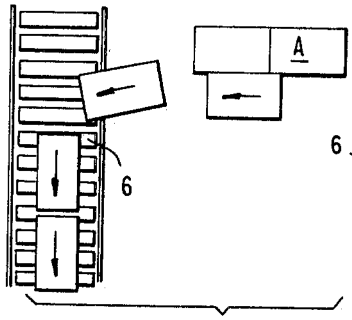
Figure 13D:
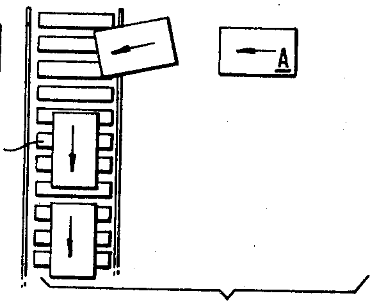
Figure 14:
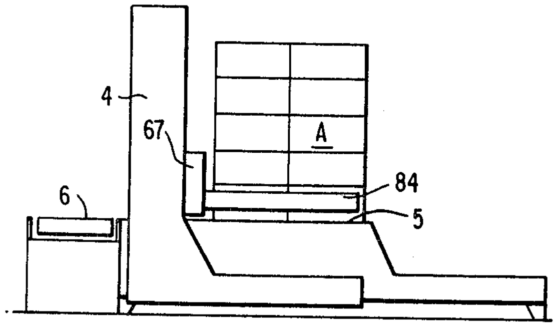
Figure 15:
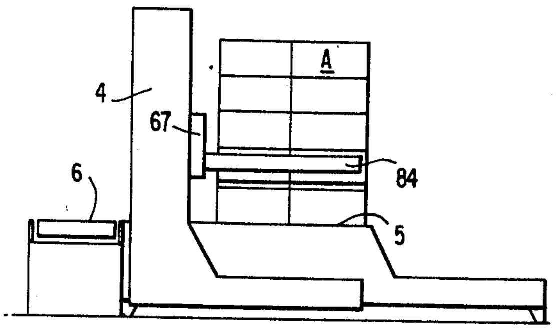
Figure 16:
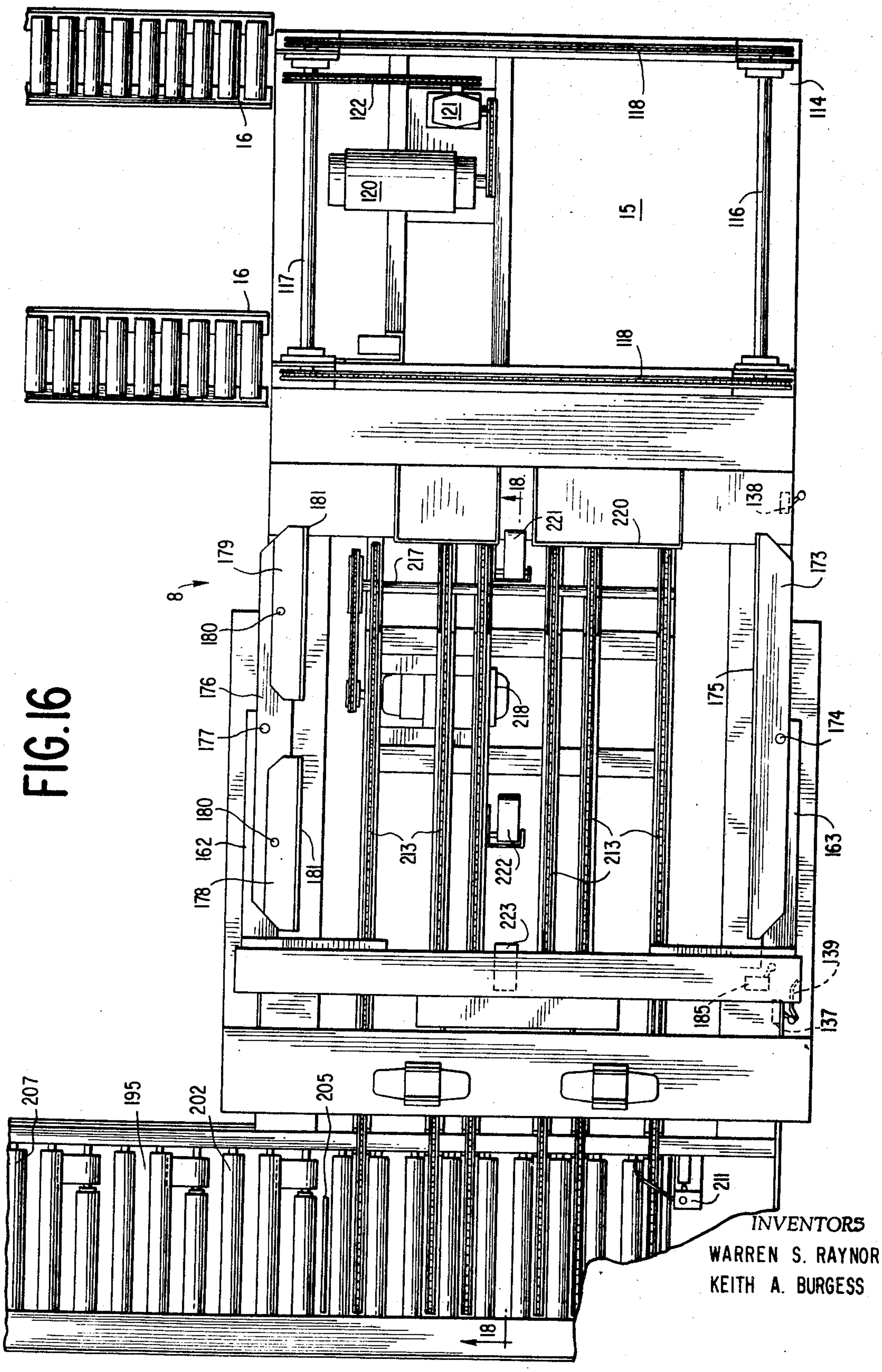
Figure 17:
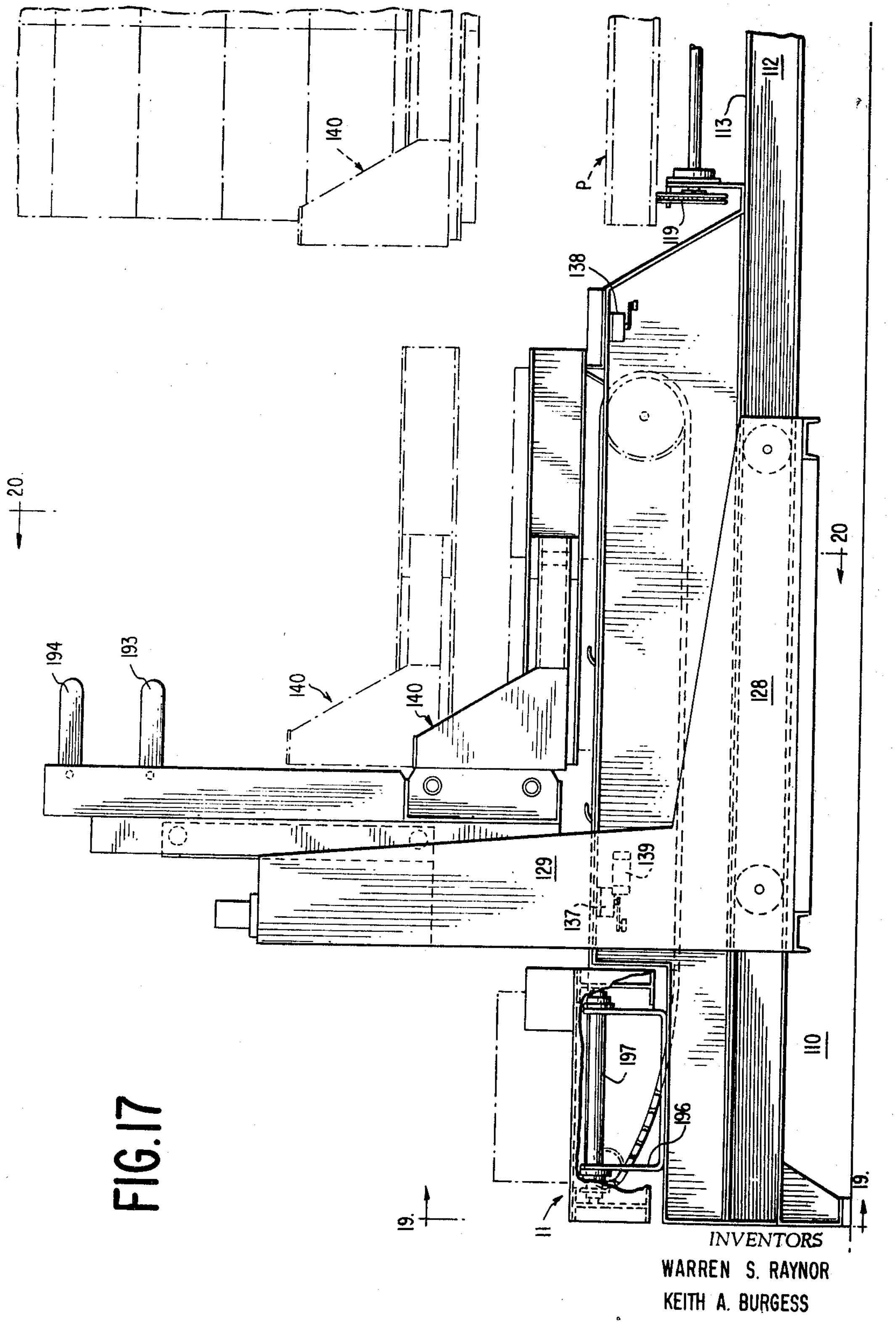
Figure 18:
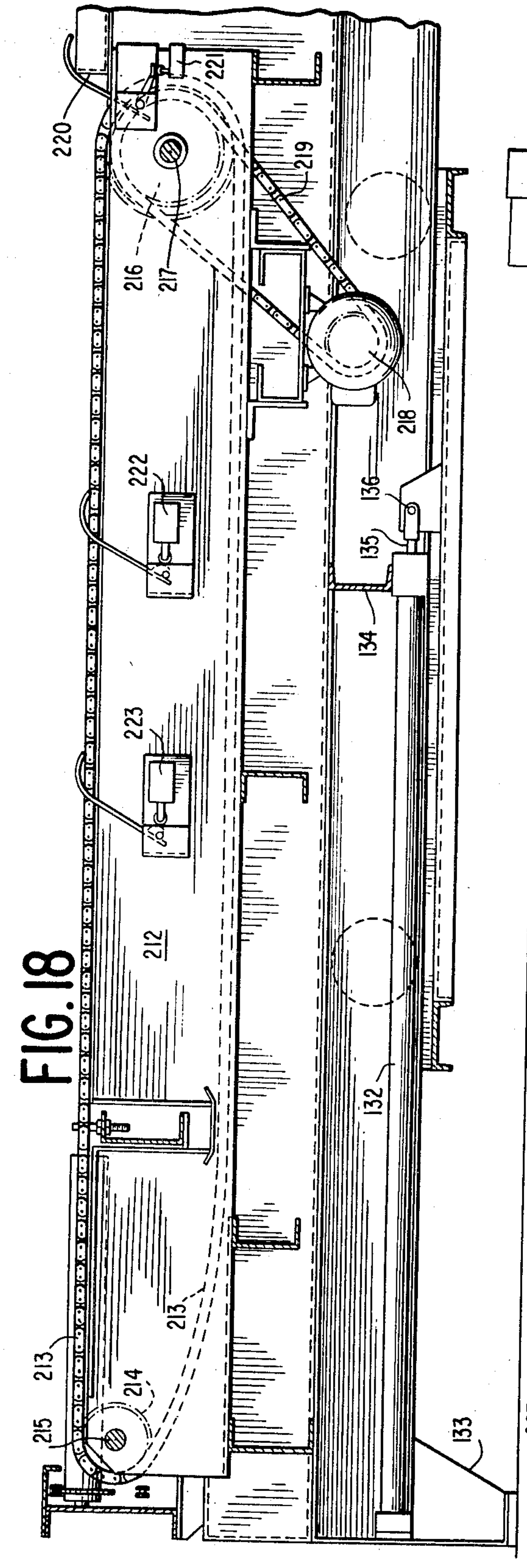
Figure 19:
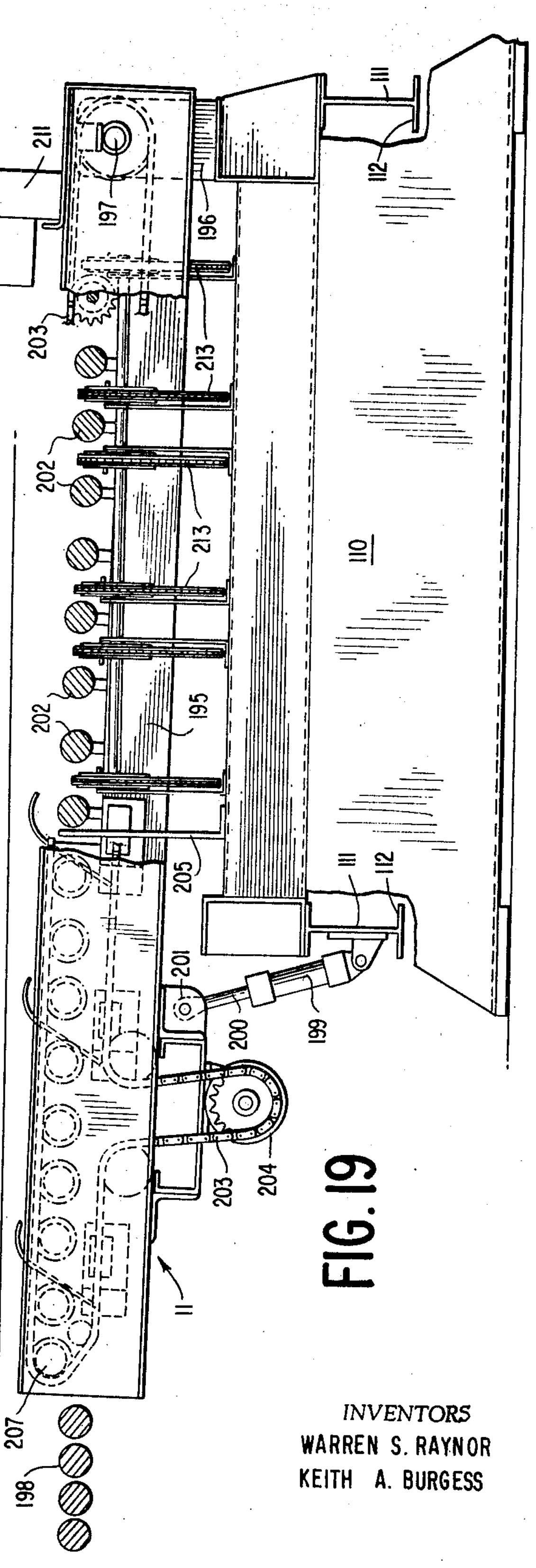
Figures 20, 20A:
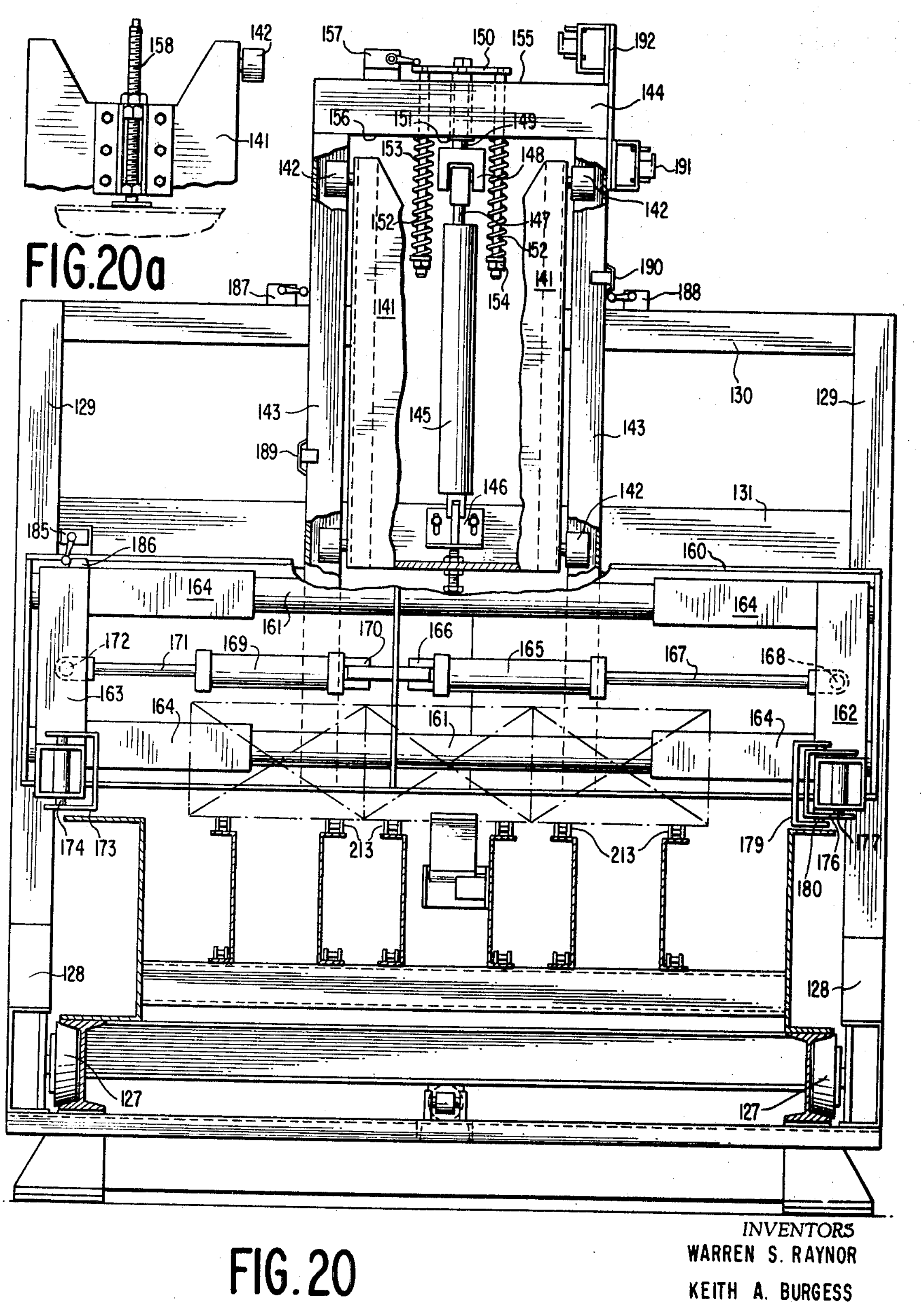
Figure 21:
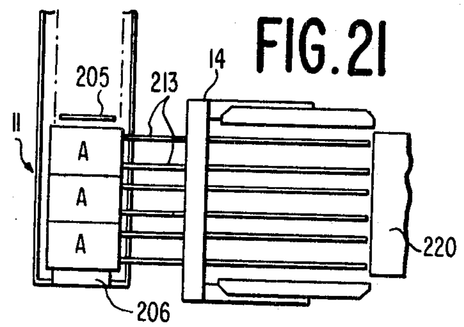
Figure 23:
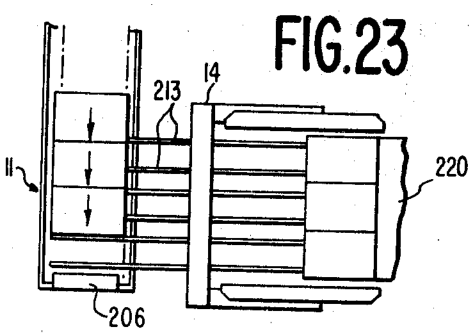
Figure 22:
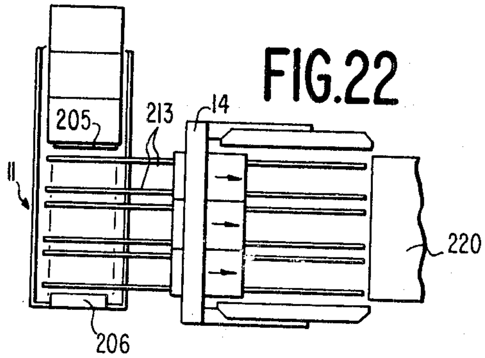
Figure 24:
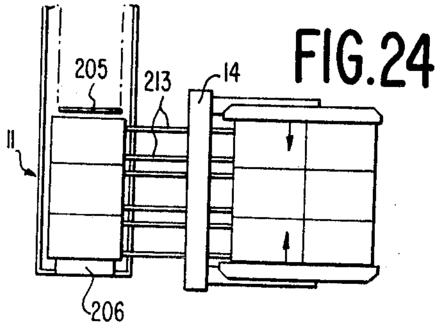
Figure 25:
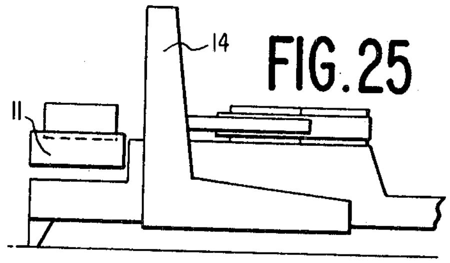
Figure 26:
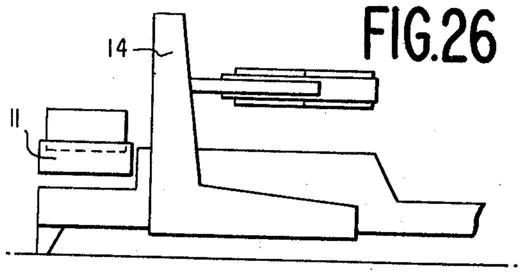
Figure 27:
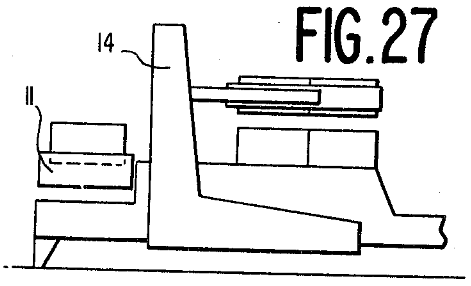
Figure 28:
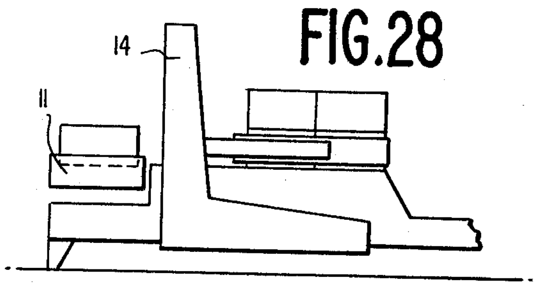
Figures 29, 30:
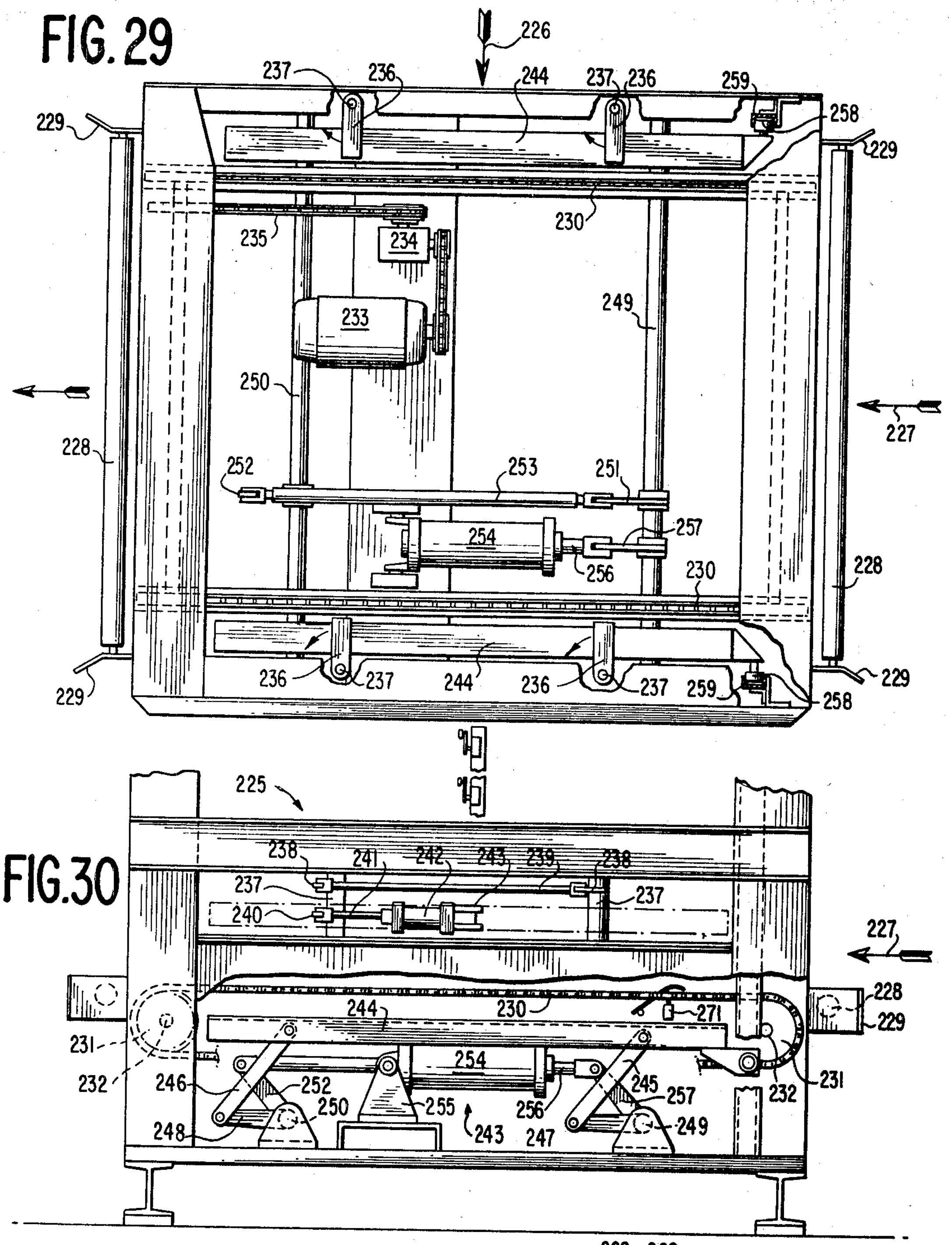
Figure 31:
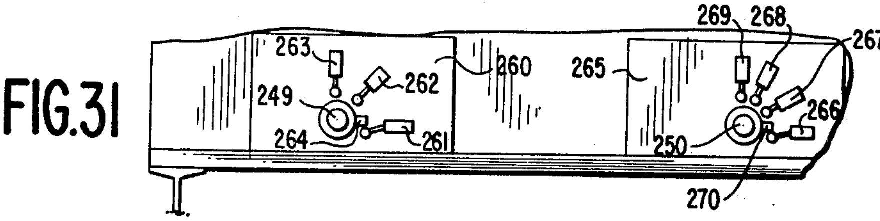
Figures 32, 33:
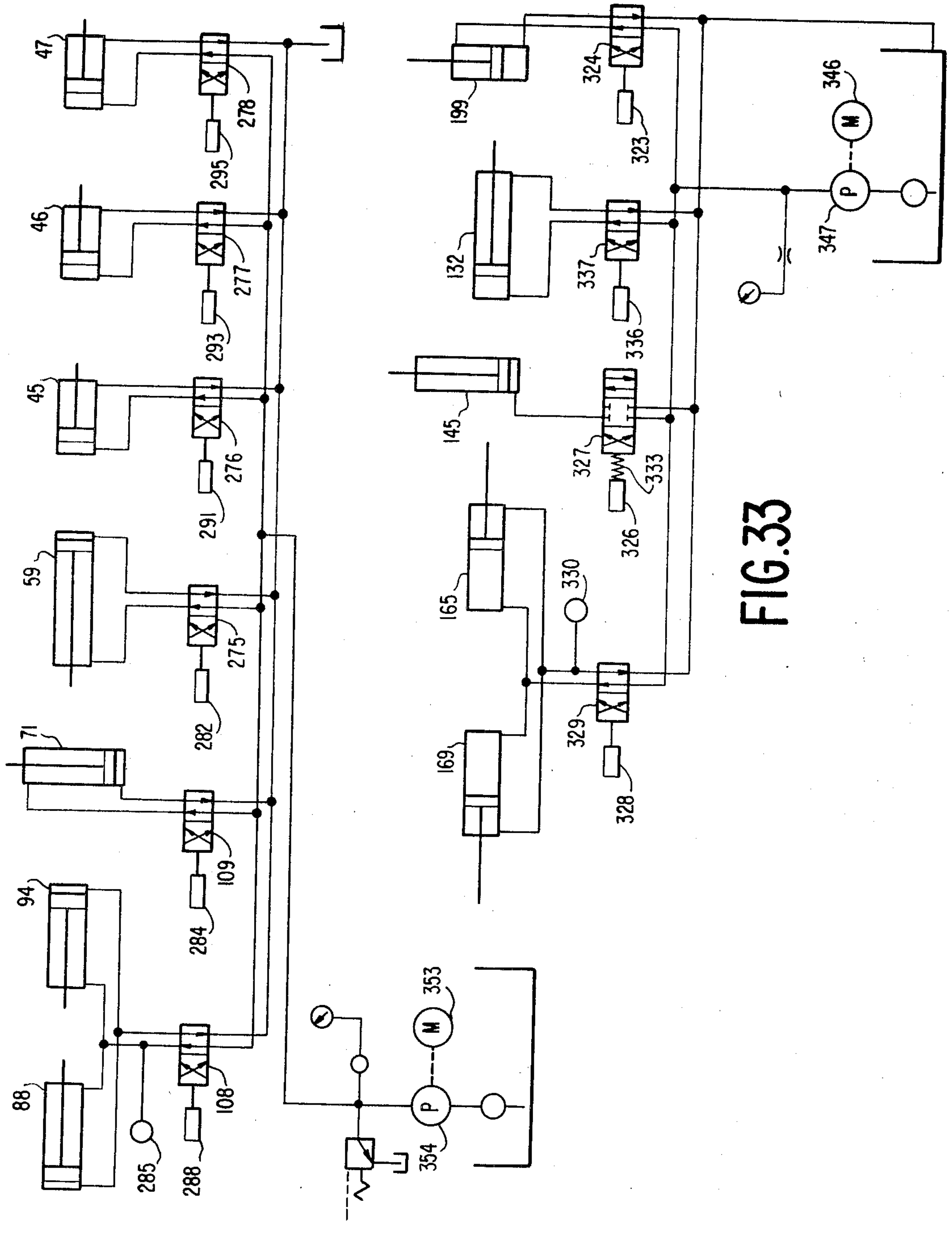
Figure 34:
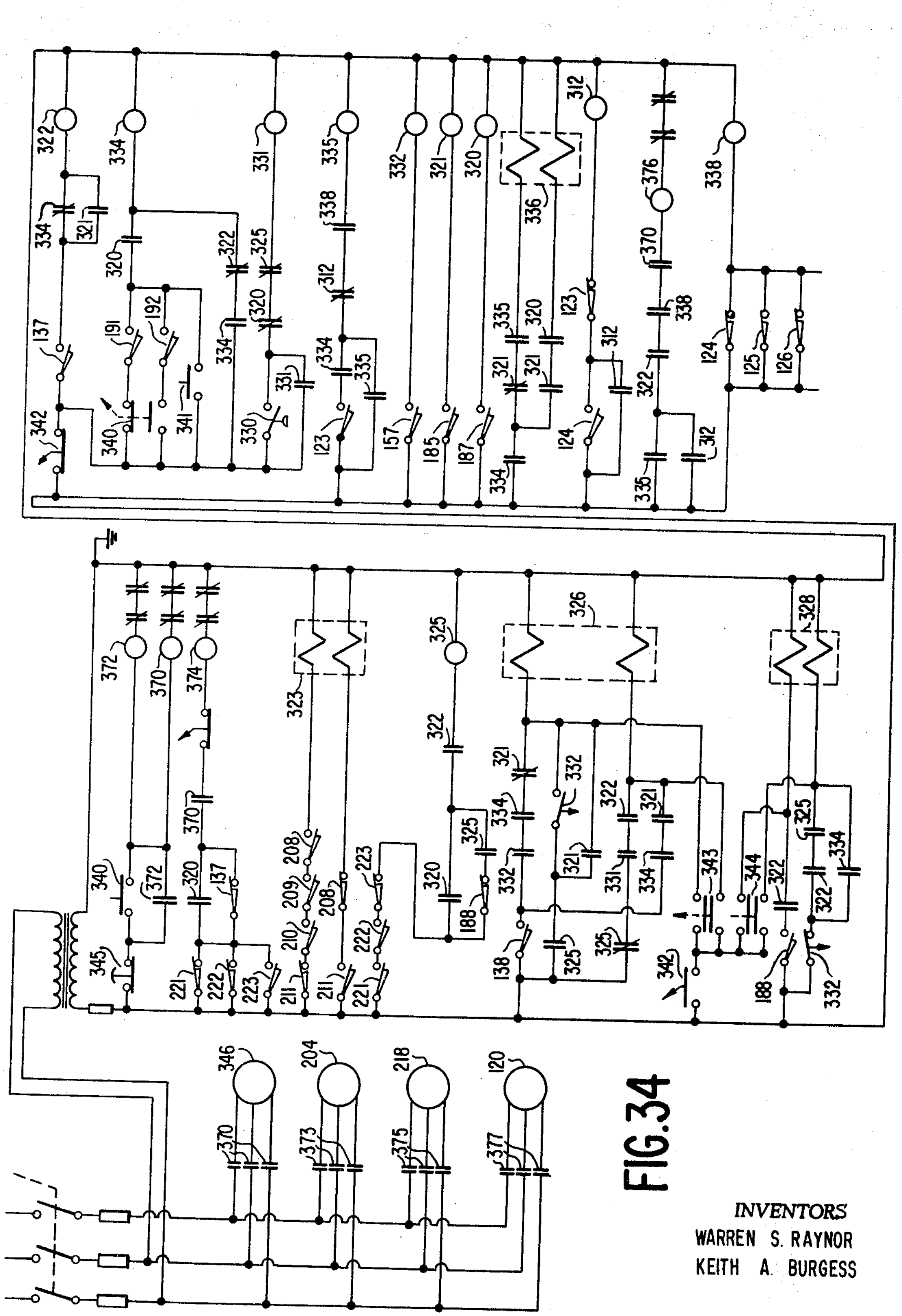
Figure 35:
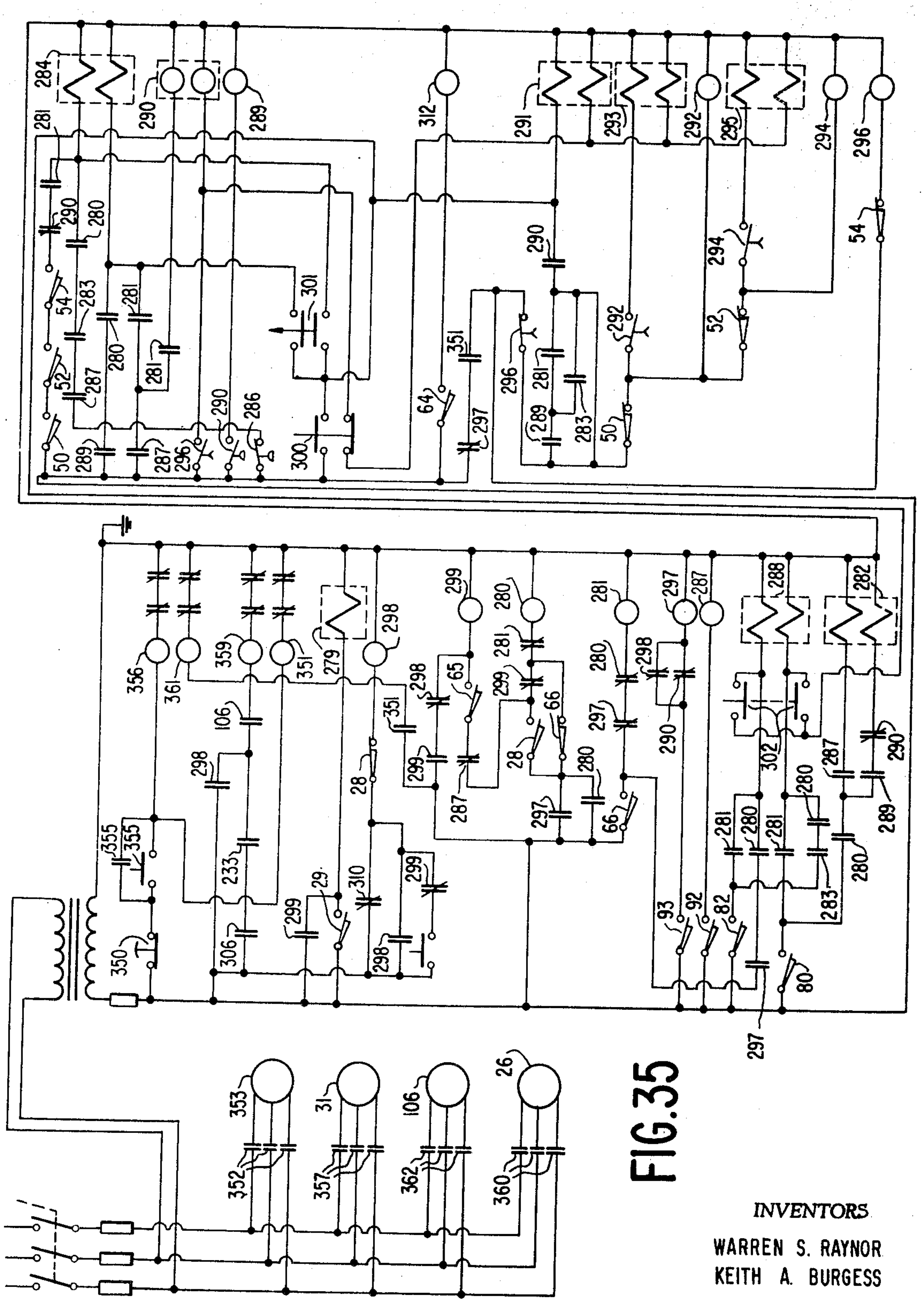
Figure 36:
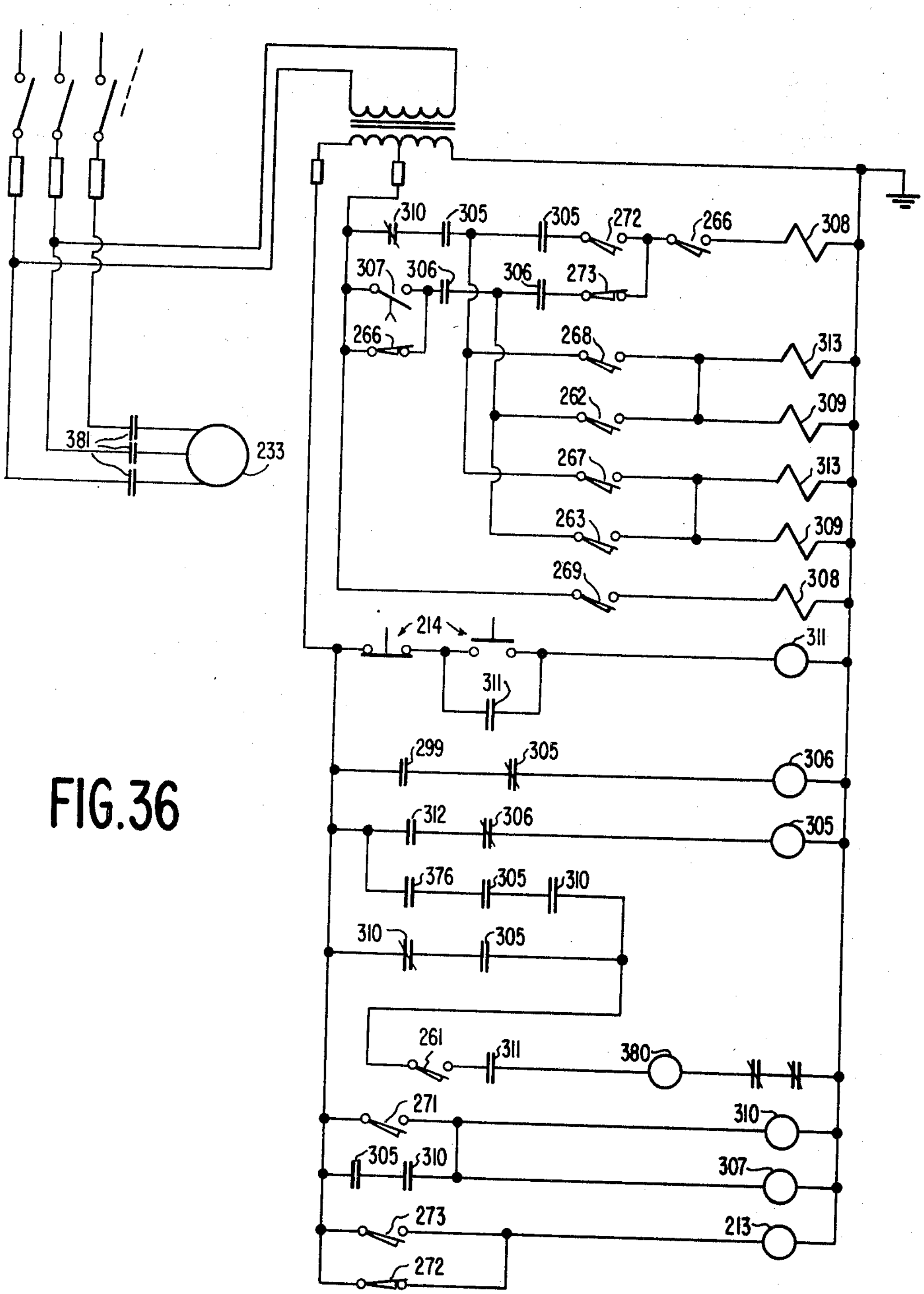

FIGS. 13*b*, 13*c*, and 13*d* are schematic showings of the sequence of removing the bottom layer of articles from beneath the stack;

FIG. 14 is a view similar to FIG. 11 showing the hoist mechanism depositing the remainder of the stack on the load supporting platform after the bottom layer has been removed;

FIG. 15 is a view similar to FIG. 12 with another layer starting to be removed;

FIG. 16 is a top plan view similar to FIG. 2, showing the pallet loader illustrated schematically in FIG. 1;

FIG. 17 is a side elevation view similar to FIG. 3 with the hoist mechanism shown in phantom in alternate positions;

FIG. 18 is a partial sectional view taken on line 18—18 of FIG. 16, showing the row transfer conveyer of the stacker;

FIG. 19 is a partial side elevation view taken on line 19—19 of FIG. 17, showing the row-forming conveyer, with parts broken away to more clearly show other parts;

FIG. 20 is a partial section elevation view taken on line 20—20 of FIG. 17, showing the hoist mechanism of the straddle car, with parts broken away to more clearly show other parts;

FIG. 20A shows the adjustable stop member for the hoist;

FIG. 21 is a top plan view schematically showing a row of articles being formed on the row forming conveyer;

FIG. 22 is a view similar to FIG. 21 showing a row of articles being transferred by the row transfer means;

FIG. 23 is a view similar to FIG. 21 showing a row of articles being formed on the row-forming conveyer;

FIG. 24 is a view similar to FIG. 22 showing a layer formed in the stacker, with a row of articles on the row-forming conveyer in position to be transferred;

FIG. 25 is a side elevation view of the loader in the position shown in FIG. 24 with the clamping jaws engaging the formed layer;

FIG. 26 is a view similar to FIG. 25 showing the first formed layer lifted by the hoist mechanism to permit a second layer to be formed thereunder;

FIG. 27 is a view similar to FIG. 26 with a second layer formed beneath the layer supported by the hoist mechanism;

FIG. 28 is a view similar to FIG. 25 with the hoist mechanism engaging the bottom layer ready to hoist it off the transfer mechanism to permit another layer to move into position thereunder;

FIG. 29 is a top plan view of the pallet stacking and dispensing magazine with certain parts broken away to more clearly show other parts;

FIG. 30 is a partial side elevation view of the pallet stacking and dispensing magazine shown in FIG. 29, with parts broken away to more clearly show other parts;

FIG. 31 is a fragmentary side elevation view showing some of the parts which were broken away in FIG. 30 and illustrating the location of control switches;

FIG. 32 is a schematic showing of the hydraulic system of the pallet unloader;

FIG. 33 is a schematic showing of the hydraulic system of the pallet unloader;

FIG. 34 is a schematic showing of the electrical control system of the pallet unloader;

FIG. 35 is a schematic showing of the electrical control system of the pallet unloader; and FIG. 36 is a schematic showing of the electrical control system of the pallet stacking and dispensing magazine.

Referring now to the drawings in detail, a material handling system according to the present invention is illustrated schematically in FIG. 1 wherein articles A stacked in superimposed layers are shown moving on an infeed conveyer 1 toward the receiving platform 2 of a pallet unloader 3. A straddle car assembly 4 removes the stack of articles from the pallets P and transfers the stack, as a unit, from the receiving platform 2 to an unstacking platform 5, where the stack is broken down from the bottom of the stack, with the articles being discharged individually from the unloader 3 onto an off-bearing conveyer 6 to be removed for further operations.

After a stack of articles has been removed from the pallet at the receiving platform 2, the empty pallet is transferred to a pallet stacking and dispensing magazine 7 positioned adjacent the receiving platform of the pallet unloader. The individual pallets are received in the magazine and stored in a vertically extending stack, and are discharged individually from the magazine, as required, to a pallet loader 8 positioned adjacent the magazine on the side opposite the pallet unloader. Individual articles moving from a processing plant 9 on an infeed conveyor 10 are shown arriving in line on the conveyer at the pallet loader. The articles are accumulated in rows of a predetermined number, such as the row of three illustrated in the drawing, on a row-forming platform 11 and the rows are transferred laterally from the platform to a stacking platform 12 and formed into layers. As a layer is formed, it is elevated by a clamp and hoist assembly 13 on a straddle car assembly 14 to permit a subsequent layer to be formed thereunder. Each layer thus formed is elevated until a stack is completed, then the stack is transferred, as a unit, by the straddle car assembly 14 and deposited onto an empty pallet which has been dispensed from the magazine 7 onto the pallet receiving platform 15. After the stack has been deposited onto the pallet, the straddle car assembly returns to the stacking platform 12, and the loaded pallet is transferred from the receiving platform 15 onto an off-bearing conveyer 16. Infeed conveyer 1 is preferably a gravity type roller conveyer which is provided with a pneumatically actuated hose brake (not shown) which is actuated by the unloader control system to control movement of loaded pallets onto the receiving platform 2.

Referring now particularly to the pallet unloader, illustrated specifically in FIGS. 2–9 of the drawings, it is seen that the unloader includes a rigid, elongated rectangular frame assembly 17 having a pair of parallel laterally spaced side frame members 18. Mounted on the outer base of each of the frame members 18 is a horizontally extending channel shaped track 19 extending substantially the full length of the frame. Frame members 18 are formed with a stepped-down portion 20 adjacent one end thereof and extending across the rectangular frame 17 at the stepped-down portions 20 is a driven chain conveyor assembly 21. The chain conveyer assembly 21 forms the supporting surface of receiving platform 12 for loaded pallets fed to the pallet unloading assembly 3 by the infeed conveyer 1. Chain conveyer assembly 21 includes a pair of spaced mounting brackets 22 formed from structural channels and extending across the end of stepped-down portion 20 of frame members 18 for mounting a pair of laterally spaced shafts 23 and 24, with the top flange of brackets 22 supporting the top run of chains 25. Sprockets mounted on each end of shafts 23 and 24 support and drive the pair of conveying chains 25. Suitable drive means, such as electric motor 26, acting through reduction gear assembly 27 and V-belt 28 drive the chains so that the top run of the chain forms, in effect, a continuation of the gravity infeed conveyer 1. A pair of limit switches 28 and 29 are mounted on frame assembly 17 between chains 23 and 24 in position to be actuated individually by a pallet being moved on the receiving platform 12 by the chains 23 and 24.

Figure 5:
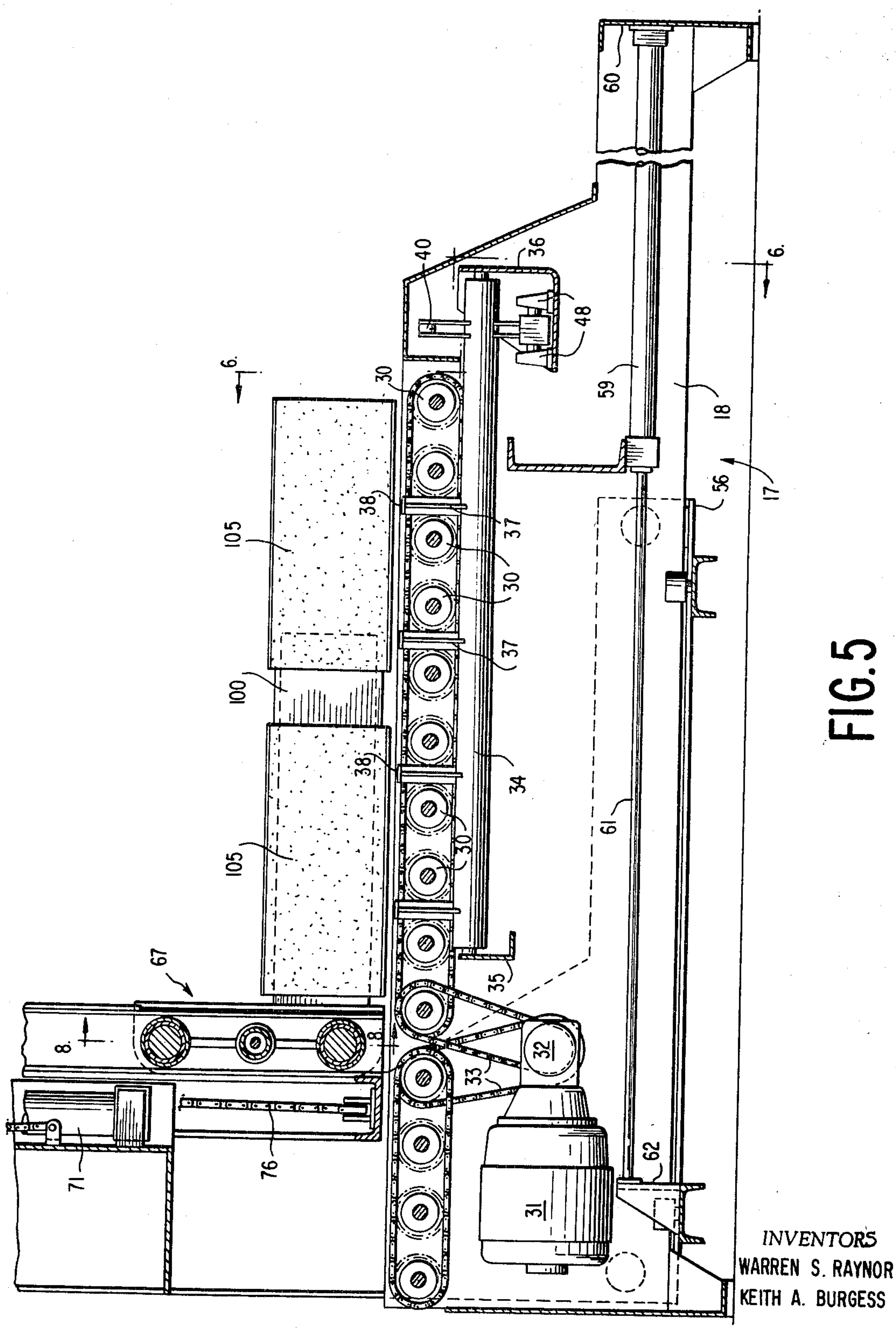
FIG. 5 is a partial sectional elevation view taken on line 5—5 of FIG. 2.
Figure 6:
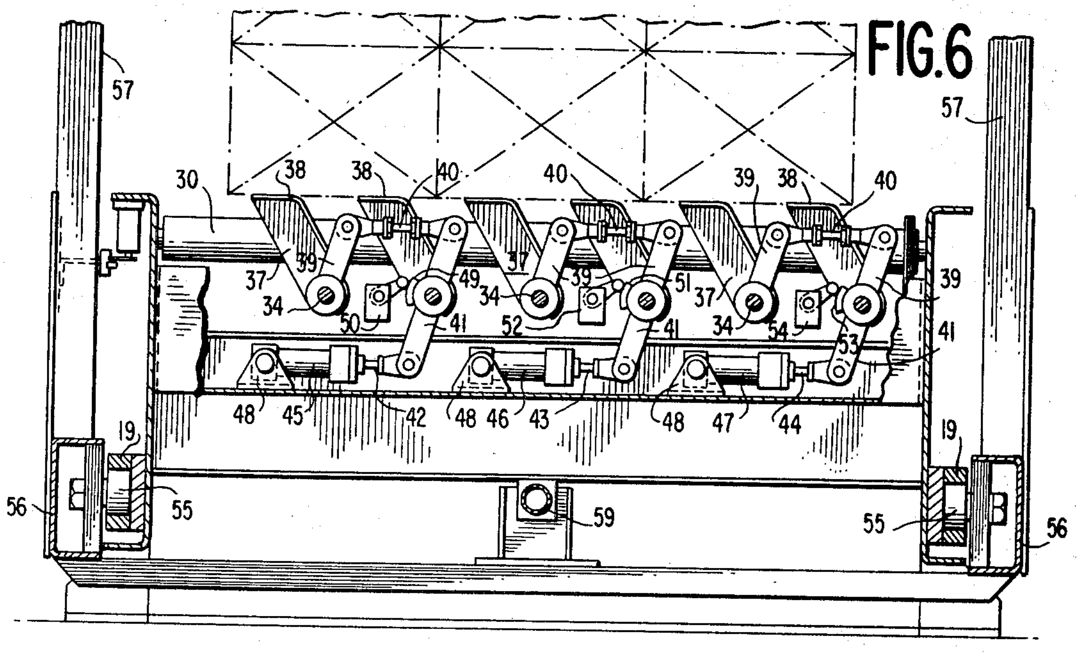
FIG. 6 is a partial sectional view taken on line 6—6 of FIG. 5 showing the load supporting fingers.
Figure 7:
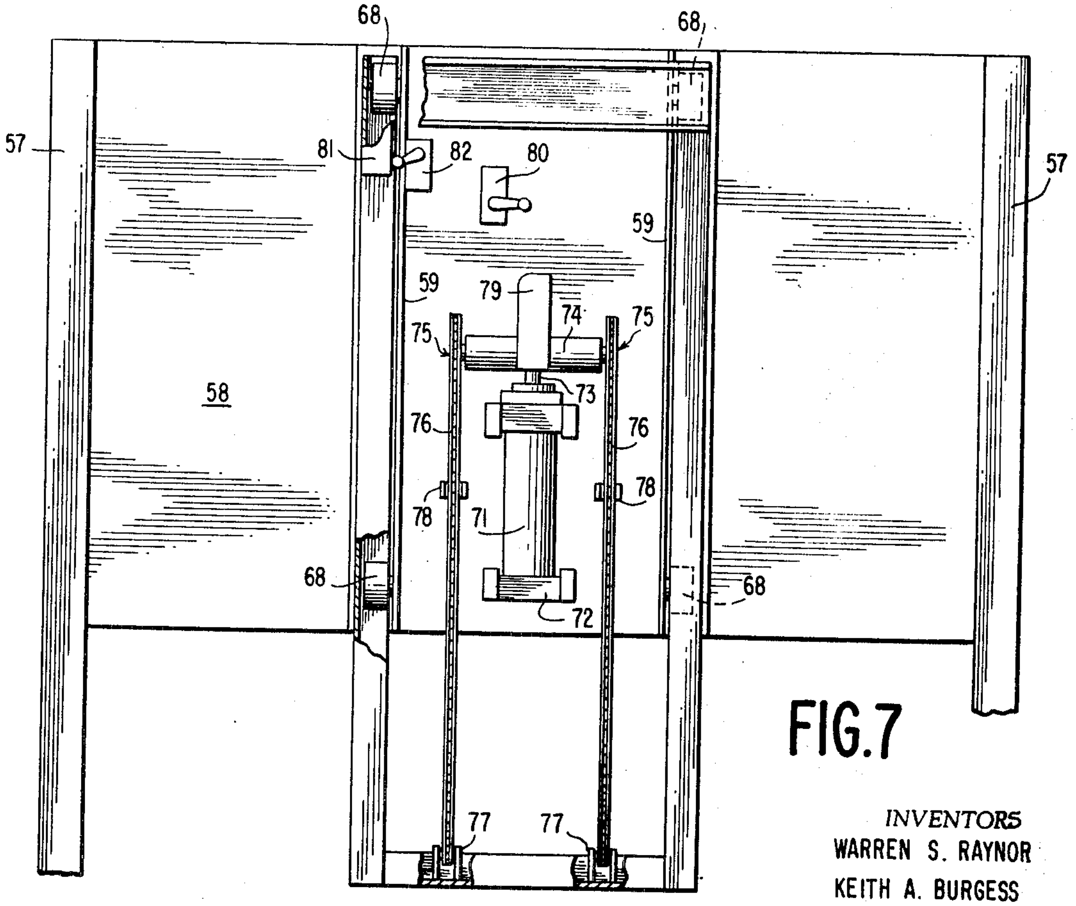
FIG. 7 is a partial sectional elevation view taken on line 7—7 of FIG. 3, showing the means for elevating the hoist mechanism.

A plurality of parallel horizontally extending laterally spaced driven rollers 30 are mounted on frame 17 and journaled for rotation between frame members 18. Rollers 30 are spaced along frame 17 from a point adjacent the stepped-down portion 20 to the end of frame assembly 17 opposite the chain conveyer 21. Suitable means, such as electric motor 31, acting through reduction gear 32 and chains 33, drive the rollers 30 for rotation about their longitudinal axis. Mounted immediately beneath rollers 30, and extending perpendicular thereto, is a plurality of parallel, laterally spaced support rods 34. The support rods 34 each have their respective ends journaled for rotation within openings in structural support elements 35 and 36 extending between frame members 18. As best seen in FIGS. 5 and 6, a plurality of support fingers 37 are rigidly fixed, as by welding, to each of said support rods 34, with fingers 34 extending upwardly between the rollers 30 and terminating in a load supporting surface 38. Fingers 37, in their elevated position extending between rollers 30, project at approximately a forty-five degree angle from a vertical plane passing through the respective support members 34. Each of said support elements 34 has rigidly fixed thereto, adjacent one end thereof, a bell crank arm 39, the cranks 39 being arranged in pairs with the cranks of each pair being connected by a coupling member 40 so that rotation of one of the support rods 34 will result in corresponding rotation of an adjacent support rod. One of the support rods 34 of each pair is provided with a second bell crank arm 41 extending downwardly therefrom and have their respective lower free end pivotally connected to the piston rods 42, 43, 44 of two-way fluid cylinders 45, 46, 47, pivotally connected, as by brackets 48, to member 36. When fluid pressure is applied to the cylinders 45, 46, 47 causing the pistons to move outwardly in the cylinders, the support rods 34, and the fingers 37 supported thereon will be rotated, thereby causing the support platforms 38 of the support fingers 37 to simultaneously move both laterally and vertically. As shown in FIG. 6, actuation of fluid cylinder 45 to rotate the support rods 34 will cause striker 49 to actuate limit switch 50. Corresponding actuation of fluid cylinder 46 causes striker 51 to actuate limit switch 52 and actuation of fluid cylinder 47 causes striker 53 to actuate limit switch 54. As shown in FIG. 31, fluid is directed to the fluid cylinders 45, 46, 47 by solenoid actuated valves 276, 277 and 278, respectively.

Figure 4:
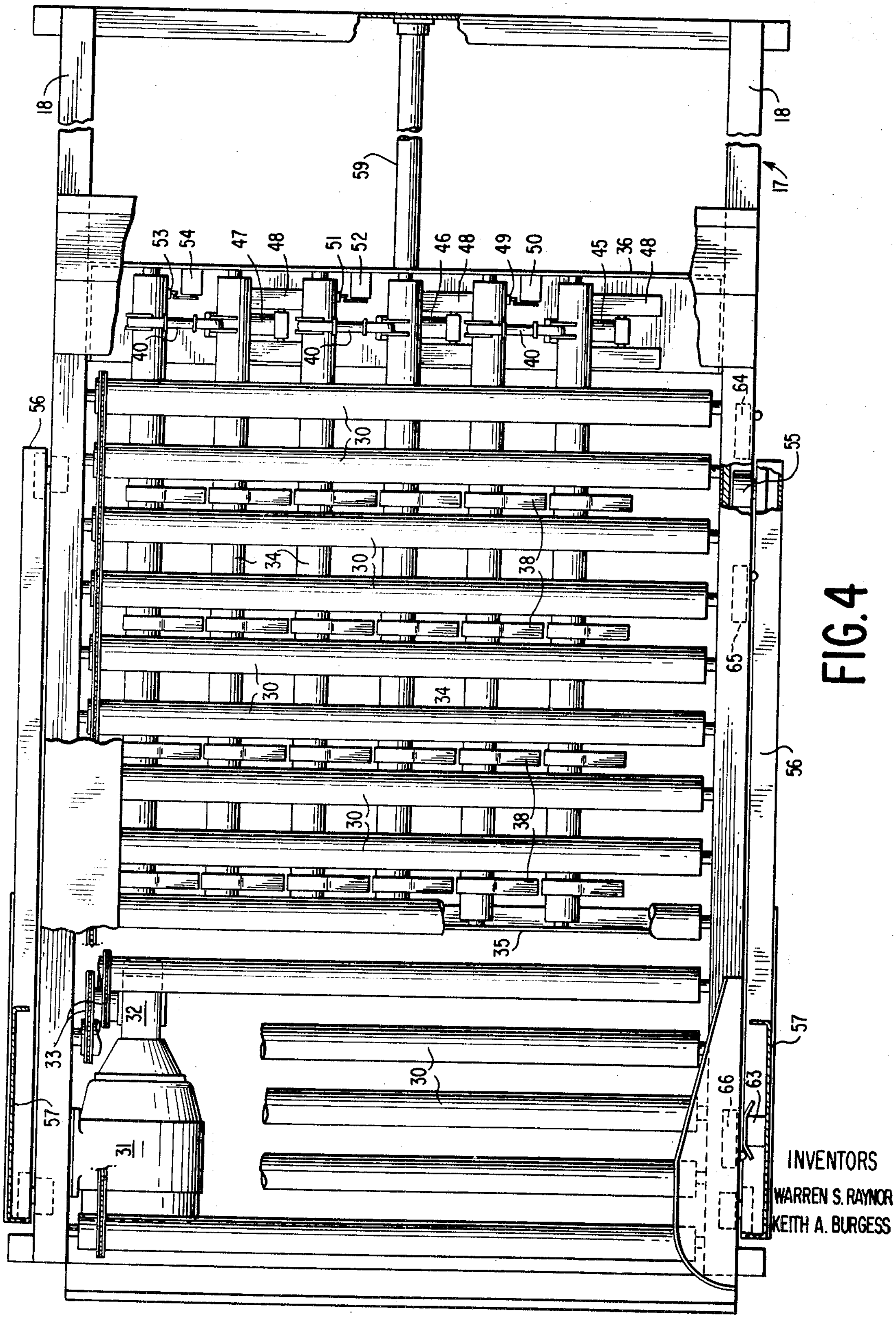
FIG. 4 is a partial sectional plan view taken on line 4—4 of FIG. 3 and showing the unstacking platform of the unloader.

Again as most clearly seen in FIGS. 4 and 6, the top load supporting surface 38 of the fingers 37 collectively form load supporting surface at unstacking platform 5, with sections of the surface (made up of the fingers on the support elements which are moved together by the individual fluid actuating cylinders 45, 46, 47) movable to separate laterally and to vertically lower portions of a layer of articles A which are supported on the platform so that the lowered articles may be conveyed from the remainder of the layer by the driven rollers 30.

A straddle car assembly 4 is supported for reciprocal movement along frame assembly 17 by a plurality of rollers 55 disposed in tracks 19. Straddle car assembly 4 comprises a frame including a pair of laterally spaced horizontally extending arms 56 mounting the rollers 55, and a pair of vertically extending side frame members 57 retained in spaced parallel relation by vertical wall member 58. A two way fluid cylinder 59 mounted on member 60 of frame assembly 17 beneath receiving platform 2 includes a movable piston rod 61 having one end fixed to straddle car 4 as by bracket 62, so that fluid pressure applied to the appropriate end of the cylinder by solenoid actuated valve 275 will cause movement of the straddle car along the tracks 19.

Actuation of the fluid cylinder 59 to cause movement of the straddle car between the receiving platform 2 and the stacking platform 5 causes a striker 63 (mounted on the straddle car 4) to engage and actuate limit switches 64, 65 and 66, successively, as the straddle car is moved along the tracks 19. The function of these limit switches will be more fully explained hereinafter.

A hoist assembly 67 is supported for vertical movement along rollers 68 fixed on angle support members 59 mounted on wall member 58. The hoist assembly includes a carriage 69 which includes a pair of vertically extending oppositely disposed channel shaped guides or tracks 70 positioned over rollers 68. Carriage 69 is driven in this vertical movement by a fluid cylinder 71 mounted on bracket 72 fixed to wall 58. Fluid, under pressure, is directed to the appropriate end of cylinder 71 by a solenoid actuated valve 109 (see FIG. 31). The upwardly extending free end of piston 73 of cylinder 71 carries a laterally extending shaft 74 having a pair of sprockets 75 mounted on its ends. A pair of chains 76 extend over sprockets 75 and have one end fixed to carriage 69 as by brackets 77, and the other end to wall member 58 as by brackets 78. A striker 79 extends above shaft 74 in position to engage and actuate a limit switch 80 when the carriage is in its upper position. A striker 81 on carriage 69 engages and actuates limit switch 82 mounted on wall 58 when the carriage is in the lowered position.

Figure 8:
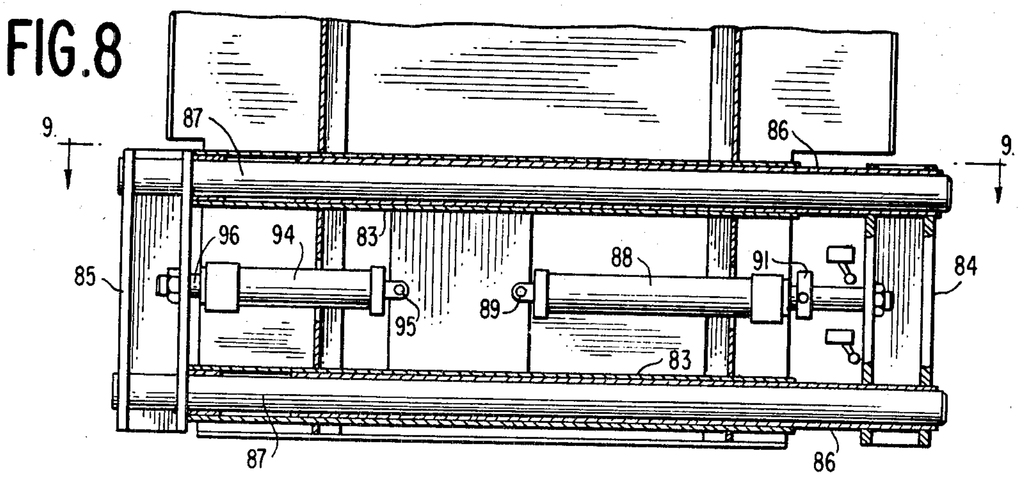
FIG. 8 is a sectional view taken on line 8—8 of FIG. 5, showing the means for moving the clamping jaws.

Supported on carriage 69 for vertical movement therewith is a pair of vertically spaced horizontal tubular support members 83 for supporting movable clamping arms 84 and 85 for movement toward and away from one another. As best seen in FIG. 8, clamping arm 84 is supported within tubular members 83 by telescoping tubular support members 86, and clamping arm 85 is supported by a pair of support rods 87 telescopingly disposed within the tubular supporting members 86. A two-way fluid cylinder 88 has one end pivotally mounted to carriage 69 as by pin 89 and the piston disposed within the cylinder has its projecting rod 90 mounted to arm 84 so that fluid, under pressure, directed to the appropriate end of the cylinder by a solenoid actuated valve 108 (see FIG. 31) will cause movement of the piston rod 90 to move arm 84 laterally with respect to carriage 69. A sleeve 91 is releasably mounted on piston rod 90 to limit the travel of the piston and thereby limit movement of clamping arm 84. A limit switch 92 is mounted on the carriage 69 in position to be actuated by sleeve 91 when the clamping arm is in the extended or open position, and limit switch 93, also mounted on the carriage, is positioned to be actuated by the clamping arm 84 when the arm is in the completely retracted or closed position.

Clamping arm 85 is moved between the extended and retracted or clamping positions by a two-way fluid cylinder 94 having one end pivotally mounted on carriage 69 as by pin 95 and having the exposed end of the movable piston rod 96 fixed to the clamping arm 85. Application of fluid pressure to the appropriate end of the cylinder by valve 108 will cause movement of the piston within cylinder 94 and thereby movement of the clamping arm by sliding rods 87 within tubular supports 86.

Figure 9:
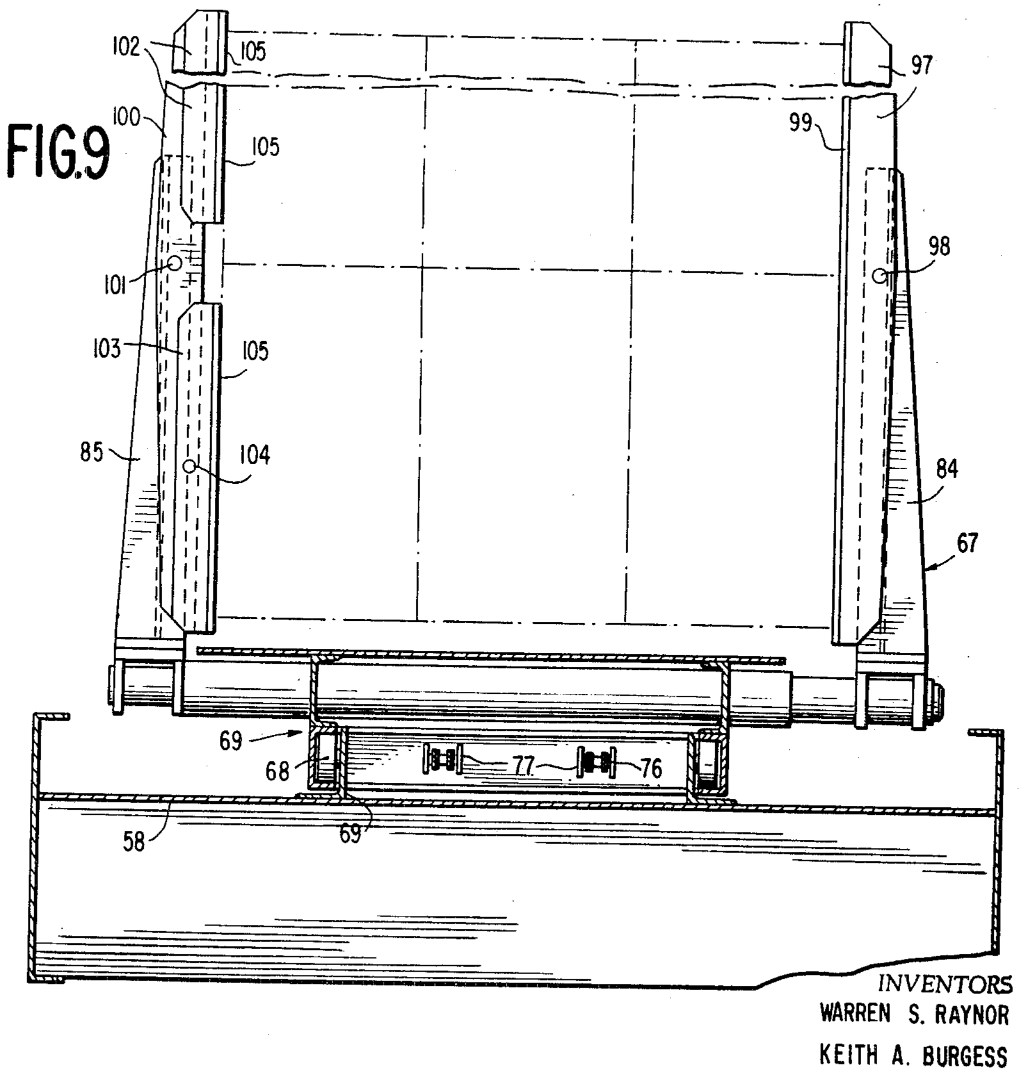
FIG. 9 is a partial section plan view taken on line 9—9 of FIG. 8, showing the clamping arms of the hoist mechanism.

To compensate for slight misalignment or uneven loading, clamping arm 84 has a clamping jaw 97 pivotally mounted, as by pin 98, on its inner surface and includes a resilient pad 99 fixed, as by bonding, to its inner vertical or clamping surface. Clamping arm 85 has a clamping jaw supporting lever 100 mounted for limited pivotal movement, as by pin 101, about a vertical axis extending through the pin. A pair of clamping jaws 102, 103 are mounted for limited pivotal movement, as by pins 104 extending vertically through lever 100, as best seen in FIG. 9. Jaws 102 and 103 may also have a resilient pad 105 bonded to their vertical clamping surfaces.

As illustrated in FIG. 3, a conventional off-bearing conveyer 6, driven by motor 106 and chains 107, is positioned adjacent the end of the unloader opposite the receiving end and in position to receive and remove the individual articles conveyed from the unloader 3. By proper adjustment of the speed of the off-bearing conveyor, as compared with the speed of the driven rollers 30 of the unloader, complete 90° turning of articles being discharged from the unloader may be accomplished as the articles move onto conveyor 6.

Figure 10:
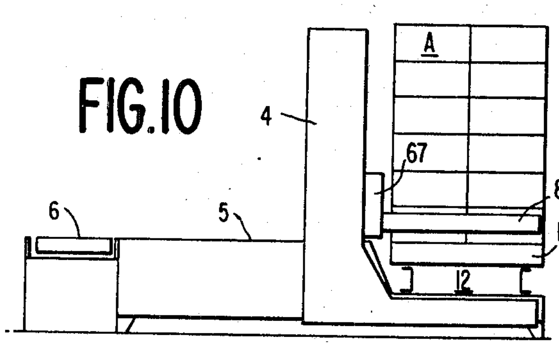
FIG. 10 is a side elevation view schematically showing the hoist in position to lift a stack of articles from a pallet.

The operation of the unloader 3 is illustrated schematically in FIGS. 10 through 15 of the drawings. Referring first to FIG. 10, a pallet P, having a plurality of articles A stacked thereon, is shown in position on the receiving platform of the unloader. The straddle car 4 is in the extended position adjacent the receiving platform with the hoist assembly 67 in the lowered position and with clamping arms 84, 85 extending alongside the lowermost layer of articles stacked on the pallet, and ready to lift the stack of articles A from pallet P and transport the stack as a unit to the unstacking platform 5. In FIG. 11, the straddle car has returned to the retracted position and the hoist assembly has lowered the stack of articles onto the unloading platform. Note that the pallet was not moved by the clamping arms. In FIG. 12, the hoist assembly has released the lower layer of articles and has moved to its upper position with the clamping arms engaging and clamping the layer of articles next above the lower layer to support that portion of the stack above the bottom layer, and fluid motor 45 has been actuated to lower two of the articles of the bottom layer onto the driven rollers 30. In FIG. 13*a* the two articles which were shown as lowered in FIG. 12 are shown moving from beneath the stack onto the offbearing conveyer 6. Note that the remainder of the bottom layer has not been lowered. FIGS. 13*b*, 13*c* and 13*d* are top plan schematic views with FIG. 13*b* illustrating the first two articles moving from beneath the stack onto the offbearing conveyer. As shown in FIG. 13*c* when the first two articles have cleared the stack, the next two articles are lowered onto the conveyer, by actuation of fluid cylinder 46 and have started to move from beneath the stack, FIG. 13*d* shows the last two articles of the layer moving from beneath the stack. In FIG. 14, the bottom layer of articles has been completely removed from beneath the stack and the hoist assembly has moved to its lower position to deposit the stack onto the unstacking platform which has been returned to the raised position by fluid cylinders 45, 46, and 47. FIG. 15 is a figure similar to FIG. 12 in which the hoist has moved to its elevated position with the clamps 84, 85 engaging the layer next above the bottom layer to support that portion of the stack above the bottom layer while the bottom layer is being removed. Note also in FIG. 12 that the empty pallet P has been removed from the receiving platform by the chain conveyer 21.

Referring now to the pallet loader, illustrated specifically in FIGS. 16–20 of the drawings it is seen that the loader possesses many of the structural features of the unloader described hereinabove. Loader 8 includes a rigid, elongated frame assembly 110 having a pair of parallel laterally spaced side frame members 111. Frame members 111 each include a horizontally extending channel shaped track 112 extending substantially the full length of the frame. Frame members 111 are formed with a stepped down portion 113 forming a pallet loading platform 15 adjacent one end of the frame and, extending across platform 15 is a driven chain conveyer assembly 114. The chain conveyer assembly 114 forms a pallet supporting surface for receiving an empty pallet from a stacker dispenser magazine and positioning the empty pallet to receive a stack of articles formed by the loader and for conveying the pallet and the stack of articles thereon away from the loader onto an off-bearing conveyer. Chain conveyer assembly 114 includes a pair of spaced mounting brackets 115 formed from structural channels and extending across the stepped-down portion 113 of the side frame members 111 for journaling a pair of laterally spaced shafts 116 and 117, with the top flange of brackets 115 supporting the top run of chains 118. Sprockets 119 mounted on each end of the respective shafts 116 and 117 support and drive the conveying chains 118. Suitable drive means, such as electric motor 120, acting through reduction gear assembly 121 and V-belt 122 drive the sprockets so that the top run of the chains form, in effect, a continuation of the gravity offbearing conveyer 16. A limit switch 123 is mounted on frame assembly 110 between chains 118 in position to be actuated by a pallet positioned on the platform. Also, a series of limit switches 124, 125, and 126 may be mounted along offbearing conveyer 16 to be actuated by loaded pallets on the offbearing conveyer, and are positioned so that, for all of the switches to be actuated at one time, it is necessary for three loaded pallets to be positioned on the offbearing conveyer adjacent the pallet loader. The purpose of these limit switches will be more fully explained hereinafter.

A straddle car assembly 14 is supported for reciprocal movement along frame assembly 110 by a plurality of rollers 127 disposed in tracks 112. Straddle car assembly 14 includes a frame having a pair of laterally spaced arms 128 extending along tracks 112 for supporting the rollers 127. A pair of vertically extending side frame members 129 project upwardly from arms 128 and are retained in spaced relation by structural members 130, 131 extending therebetween. A fluid cylinder 132 mounted on cross members 133, 134 of frame assembly 110 includes a movable piston rod 135 having its free end fixed to straddle car 14 as at 136, so that fluid pressure applied to the cylinder will cause movement of the piston to move straddle car 14 along the tracks 112 between the pallet loading platform 15 at one end of frame assembly, and a stacking platform 12 adjacent the other end of the rectangular frame assembly. Limit switches 137 and 138 are mounted on frame assembly 10 so that a striker 139 mounted on the straddle car will actuate limit switch 138 when the straddle car is at the pallet loading position, and will actuate limit switch 137 when the straddle car is at the stack forming position. The function of these limit switches will be more fully explained hereinafter.

Referring to FIG. 20 on the drawings, it is seen that a hoist assembly 140 is mounted for movement between an elevated and a lowered position along a vertical guide block 141 mounted on cross members 130, 131. A pair of rollers 142 are mounted on each side of the guide block, with one of each pair of rollers near the top of the guide block and the other of each pair positioned near the lower end of the guide block. Hoist assembly 140 includes a pair of oppositely disposed channel shaped tracks or guide members 143 positioned over rollers 142 for vertical movement with respect to block 141. A structural crossbeam 144 extends between and is rigidly fixed to the upper ends of track members 143. A fluid cylinder 145 has one end pivotally mounted, as by bracket 146 to structural member 131 of the straddle car 14 and has the free end of its piston rod 147 pivotally mounted to an eye 148 of a rod 149. Rod 149 extends vertically upward through an opening in crossbeam 144 and has its upper end secured to a crosshead member 150. The shoulder 151 is formed on rod 149 in position to engage the bottom surface of beam 144 is limit vertical movement of rod 149. A pair of tie-rods 152 are mounted on and extend downwardly from the distal ends of crosshead member 150, through beam 144, and a coil spring 153 is received over the downwardly depending ends of rods 152. A compressive load is placed in the springs 153 by nuts 154 threaded onto rods 152 so that, when no load is on the hoist, crossbeam 144 will be lifted by the force of the springs vertically above the upper surface of shoulder 151 until the top surface 155 of member 144 engages crosshead 150. However, upon the application of load onto the hoist, additional stress will be placed in the springs 153, permitting crosshead 150 to be lifted to permit crossbeam to rest directly on and be supported by shoulder 151. A limit switch 157 is mounted on the top surface of cross member 144 in position to be actuated by crosshead 150 when beam 144 is supported on shoulder 151.

As shown in FIG. 20A, guide block 141 may include an adjustable stop member 158 for limiting the vertical movement of the hoist.

Mounted on vertically movable tracks 143 for movement therewith is a generally rectangular frame 160 supporting a pair of vertically spaced horizontally extending cylindrical guide bars 161. A pair of laterally movable clamping arms 162, 163 are mounted for movement along support rods 161 toward and away from one another. Clamping arms 162, 163 each include a pair of tubular sleeves 164 mounted on guides 161 for telescoping movement therealong a two-way fluid cylinder 165 having one end pivotally mounted to the straddle car frame as at 166, has the free end of its piston rod 167 pivotally connected, as by pin 168, to arm 165 to move the arm along guide rods 161. Similarly, a two-way fluid cylinder 169 has one end pivotally mounted to the straddle car frame, as at 170, and has the free end of its piston rod 171 pivotally connected, as by pin 172, to arm 162 to move arm 162 along guide rods 161. Referring to FIG. 16, it is seen that clamping arms 163 includes a clamping jaw 173 pivotally mounted thereon as by pin 174 for limited pivotal movement about a vertical axis extending through pin 174. Clamping jaw 173 may have a resilient pad 175 attached as by bonding to its vertical clamping face.

Clamping arm 162 has a clamping jaw support lever 176 mounted for limited pivotal movement, as by pin 177, about a vertical axis extending through the pin. A pair of clamping jaws 178, 179 are mounted for limited pivotal movement, as by pins 180 extending vertically through lever 176. Jaws 178 and 179 may also have a resilient pad 181 bonded to their vertical clamping surfaces.

Limit switch 185 is mounted on the frame of the straddle car in position to be actuated by a striker 186 fixed on clamping arm 163 when the arm is in the extended or opened position. Also, limit switches 187 and 188 are mounted on the frame member 130 of the straddle car and so positioned that limit switch 187 is actuated by a striker 189 on one of the tracks 143 when the hoist is in the elevated position, and limit switch 188 is actuated by striker 190 when the hoist is in the lowered position. Limit switches 191 and 192 are mounted on the hoist mast, with limit switch 192 being positioned vertically above limit switch 191. Pivoted striker arms 193 and 194 are mounted on the mast adjacent limit switches 191 and 192 respectively in position to be engaged and pivoted upward by the top surface of the top layer of a stack of articles to actuate the limit switches associated therewith when the stack of articles reaches a predetermined height.

A row-forming unit 11, best seen in FIG. 19, is mounted on the end of the loader frame at the end opposite the pallet receiving platform. The row-forming unit includes a live roller conveyor assembly 195 having one end pivotally supported on the loader frame 110 by a bracket 196 and pin 197. The conveyor unit extends across the end of the loader and terminates at a point spaced from the side of the loader opposite the pivotal mounting and adjacent an infeed conveyor 198. The conveyer section 195 has its other end supported by a fluid cylinder 199 having one end pivotally mounted to frame member 111 of the loader, and the free end of the piston rod 200 pivotally mounted to a bracket 201 rigidly mounted on the bottom surface of the conveyer section 195. The conveyor includes a plurality of laterally spaced parallel rollers 202 continuously driven for rotation about their respective axis by chain 203 and motor 204. As is evident from FIG. 19, the application of fluid pressure to cylinder 199 will cause the conveyer to be pivoted about the pivotal mounting pin 197 to raise the opposite end of the conveyer above the elevation of the infeed conveyer 198. Release of the fluid pressure to the cylinder will permit the conveyer to be pivoted in an opposite direction so that the driven rollers 202 form, in effect, a continuation of the infeed conveyer. A rigid stop member 205 is fixedly secured, as by welding, to a structural member of frame 110, and projects upwardly between a predetermined pair of the driven rollers 202, when the conveyer is in its lowered position, to form a positive stop for articles moving on the conveyor. The stop is so dimensioned that, when the conveyer is in its raised position (illustrated in FIG. 19) articles moving on the conveyer will pass freely above the top edge of the stop 205 and be permitted to move along the conveyer until they engage a stop member 206 positioned above the level of the rollers 202 adjacent pivoted end of conveyor 195.

When the conveyer is in the elevated position as illustrated in FIG. 19, articles moving toward the row former 11 on infeed conveyer 198 will engage the end roller 207 of the conveyer section and be stopped thereby. However, when the conveyer 195 is in its lowered position articles moving on infeed conveyer 198 may freely move over the end roller 207 onto the row-forming unit until the leading edge of the first article engages stop 205. In this position, the leading article actuates a limit switch 208 mounted on the conveyer, and subsequent articles following in line on the infeed conveyer will follow and be stopped by the leading article in position to engage and actuate limit switches 209 and 210 successively and completely fill the accumulator section of conveyer 195 between the stop 205 and the end roller 207.

With the conveyer again raised to the elevated position, the row of articles positioned on the conveyer 195 above limit switches 208, 209 and 210 may freely pass over the upper edge of stop 205 and continue until the leading article engages and is stopped by member 206, while other articles moving on infeed conveyer 198 will be stopped by the elevated end roll 207. When the leading article of a row is in position against stop 206, it engages and actuates limit switch 211 mounted on conveyer 195.

A row transfer conveyer 212, best seen in FIG. 18, is provided to transfer rows of articles formed on the row forming unit 11 to the stacking platform area 12 of the loader 8. This row conveyer unit 212 includes a plurality of endless conveyer chains 213 each trained over a sprocket 214 on shaft 215, positioned below and extending perpendicular to the driven rollers of row forming conveyer 195, and extending around sprockets 216 rotatably fixed on shaft 217, journaled for rotation about an axis parallel to shaft 215 and spaced laterally therefrom in the direction of the pallet loading platform conveyer. The diameter of sprockets 215 is such that, when the row forming conveyer unit 11 is in its elevated position the top of rollers 202 extend above the top surface of chains 213, but when the row forming conveyer is in its lowered position the top surface of chains 213 are above the top surface of rollers 202.

Chains 213 of the row transfer conveyer 212 are driven by electric motor 218 and chain 219 in a direction to move the top run of the chains 213 from the row forming unit toward the pallet load receiving platform so that articles which are supported on the rollers of the row forming unit 11 above the chains 213 when the row forming conveyer is in its elevated position will be deposited on the chains 213 when the row forming conveyer is lowered and the articles will be transferred, as a row, in a direction perpendicular to the direction of movement on the row forming conveyer. A rigid stop member 220 mounted on frame 110 of the loader extends across the path of articles moving on the chains at a point spaced above and adjacent the end of the conveyer to engage and stop a row of articles being transferred by the chains. A limit switch 221 is mounted on frame 110 of the loader in a position to be actuated by articles which have been transferred into the loader on the conveyer chains 213 when the articles are in position against stop 220. Limit switches 222 and 223 are also mounted on frame 110 in position to be actuated by articles as they move on chains 213, with limit switch 222 being so positioned that it will remain actuated by a second row of articles when the second row is in position against a first row which, in turn, is in position against stop 220. Limit switch 223 is so positioned that it will be actuated as a row of articles move over it, but will be released by the second row of articles as the articles are positioned against the first row.

Referring now to the stacker dispenser magazine 7, as illustrated in the drawings at FIGS. 1 and 29, it is seen that the pallet stacker-dispenser magazine is positioned between and immediately adjacent the pallet unloader 3 and the pallet loader 8. Magazine 7 is in position to receive empty pallets discharged from the pallet unloader and store the empty pallets in the magazine as required, and to dispense empty pallets from the stored supply to the pallet loader as required. As shown in FIGS. 1 and 29, the magazine is provided with a vertically extending pallet receiving and storage shaft 225 which is open at one side at 226 to permit the removal of surplus pallets or to permit the introduction of additional pallets as required by an unbalanced operation of the loader and unloader of the material handling system.

As indicated by the arrow at 227 in FIGS. 29 and 30 empty pallets discharged individually from the chain conveyer of the pallet receiving platform 2 of the pallet loader 3 will move directly into the magazine 7 through an inlet opening in the side of the magazine. The empty pallet is supported and guided in its movement into the magazine by roller 228 and stationary guide members 229, and is positioned within the magazine by the conveyer chains 230 in proper location to be elevated for storage within the magazine or delivered from the magazine to the loader. Conveyer chains 230 are mounted on sprockets 231 mounted on spaced parallel shafts 232, and are driven by motor 233 acting through reduction gear 234 and drive chain 235 so that the top run of the chains 230 move in a direction from the unloader toward the loader. While one empty pallet is normally maintained in position on the conveyer chains (in the delivery position), as more fully hereinafter described, additional pallets stored within the magazine are supported upon a plurality of support fingers 236. As more clearly shown in FIG. 29, a pair of support fingers 236 are located on each of two opposed sides of the magazine shaft. Each of the support fingers 236 is fixed to a vertically disposed pivot pin 237 which is journaled in the frame of the magazine for limited rotation about a vertical axis. Each pivot pin 237 is provided with a laterally extending crank arm 238, with the crank arms 238 of each pair being connected by a link 239 which transmits pivotal movement of one to the other of the pins in a pair. One of the pivot pins 237 of each set of pins is provided with a second crank arm 240 which is pivotally connected to the free end of a piston rod 241 of a two-way fluid cylinder 242. Cylinders 242 are pivotally supported on the machine frame, as by brackets 243, and may be selectively actuated to position the support fingers 236 either in the extended positions shown in FIG. 29 or in the retracted position as indicated by the arrows in FIG. 29. The individual fluid cylinders 242 are actuated simultaneously to assure synchronous movement of the support fingers.

To move empty pallets between the stored positions in the magazine, in which the pallets are supported on the fingers 236, and the delivery position on the conveyor chains 230, a pallet lift device, indicated generally by the numeral 243, is provided within the bottom portion of the shaft of the magazine. The lift device includes a pair of elongated pallet engaging arms 244, with one of the arms 244 being positioned on each of two opposed sides of the magazine shaft and disposed imediately outboard of the conveyor chains 230. Each of the arms 244 are pivotally connected adjacent their ends to support links 245 and 246 respectively, which, in turn, are pivotally coupled at their other ends to cranks 247 and 248. Cranks 247 and 248 respectively are fixedly secured as by welding to control shafts 249 and 250 journaled in journal blocks 251 on the machine frame for rotation about parallel laterally spaced axes. Cranks 251 and 252, mounted on shafts 249 and 250, respectively, are connected by a link 253 so that rotation of shafts 249 will result in corresponding simultaneous rotation of shafts 250.

A reversible fluid cylinder 254 is pivotally mounted to the magazine frame, as by bracket 255, with the free end of the piston rod 256 pivotally connected to a driving crank 257 fixed to shaft 249.

Referring to FIG. 30 can be seen that actuation of the fluid cylinder 254 will cause the pallet engaging arms 244 to move from their full line lower position to the phantom line elevated position and, conversely, actuation of the motor in the opposite direction will move the arms from the phantom line position to the full line position. To guide arms 244 in their vertical movement in the shaft of magazine 7, each arm is provided with a roller 258 disposed within a vertically extending channel shaped track 259 mounted on the frame of the magazine. Since an empty pallet is normally maintained in the delivery position within the stacker dispenser, when a stack of articles are moved from a pallet by the pallet unloader it is necessary for the empty pallet which is in the delivery position to be moved upward into the storage magazine before the next empty pallet can be moved into the magazine. To accomplish this, the fluid cylinder 254 is actuated to move the pallet engaging arms 244 upward to elevate the pallet normally supported on chains 230. As the pallet engaging arms approach their uppermost positions in which any pallets stored within the magazine are supported by the top surface of the pallet being elevated, the fluid cylinders 242 will be actuated to cause the support fingers 236 to move to the retracted position and remain in the retracted position until the support arms have reached their uppermost position. Cylinder 254 is then actuated to lower the support arms, and cylinders 242 are actuated to move the support fingers 236 to their extended position to engage and retain the pallet which has been elevated by the engaging arm. Once the pallet engaging arms have returned to their fully retracted position, the chain conveyors on the pallet unloader and the stacking dispenser will be actuated to transfer the empty pallet from the receiving platform of the loader to the delivery position within the magazine.

When an empty pallet is demanded by the pallet loader 8, the empty pallet P which is in the delivery position on the conveyor chains 230 of the stacker dispenser 2 will move directly from the dispenser onto the conveyor chains 118 of the loader to be moved into position to receive a load of articles. If, by the time the pallet dispensed by the magazine is in position on the pallet loader, another empty pallet is ready to be discharged from the unloader, the empty pallet will move directly from the unloader into the delivery position within the magazine. However, if no empty pallet is available on the receiving platform of the unloader, the cylinder 254 will be actuated to elevate the pallet engaging arms 244 to their uppermost position where they will engage and support the bottom pallet stored within the magazine. At this point the cylinders 242 are actuated to retract the support fingers 236 and cylinder 254 is reversed to lower the pallet engaging arms. Once the pallet engaging arms have been lowered a distance sufficient to permit the lowermost pallet within the stack to clear the support fingers 236, cylinders 242 are actuated to extend the fingers to engage the pallet next above the bottom pallet to support the stack, and the pallet engaging arms are continued in their downward movement until the pallet supported thereon is in the delivery position on the conveyor chain 230.

The electrical circuitry used to control the movement of the stacker dispenser and coordinate its movement with the loader and unloader is more fully explained below. However, it should be pointed out that the circuitry includes a plurality of limit switches mounted upon the stacker dispenser, with their physical location being most clearly seen in FIGS. 30 and 31 of the drawings. As shown in FIG. 31, a limit switch mounting plate 260 is fixed on the frame of the magazine in close proximity to shaft 249, with limit switches 261, 262, and 263 being positioned on the mounting plate. A striker arm 264 is fixed on shaft 249 for rotation therewith so that limit switch 261 will be actuated thereby when the pallet engaging arms are in their lower position; limit switch 262 will be actuated by movement of the shaft 249 to move the arms 244 between their lower and upper position, and limit switch 263 will be actuated when the pallet engaging arms are in their upper position. Also, a limit switch mounting plate 265 is mounted on the frame of the magazine in close proximity to shaft 250 and limit switches 266, 267, 268 and 269 are mounted on plate 265. A striker arm 270 is fixed to shaft 250 for rotation therewith so that limit switch 266 will be actuated thereby when the arms are in their lowered position and limit switch 269 will be actuated when the arms are in the uppermost position. Limit switches 267 and 268 will be actuated successively by striker arm 270 in its movement between limit switches 266 and 269. Limit switch 271 is mounted on the frame of the magazine in position to be actuated by a pallet in the delivery position on chains 230. Limit switches 272 and 273 are mounted on the frame of the magazine along the storage shaft 225 in position to be actuated by an empty pallet in the magazine, with limit switch 272 being positioned to be actuated by the lowermost pallet supported on fingers 236 and limit switch 273 being positioned adjacent the top of the magazine to signal when the magazine storage shaft is filled to capacity.

PALLET UNLOADER

Operation

When the pallet unloader is shut down the straddle car 4 is normally retracted over the unstacking platform 5 where limit switch 66 is actuated by striker 63 on the straddle car; carriage 69 of the hoist 67 is in its elevated position where limit switch 80 is actuated by striker 79 on the rod for the piston and pallet cylinder 71; the arms 84, 85 of the clamp are opened where limit switch 92 is engaged by striker 91 on the rod for the piston in hydraulic cylinder 71.

In this condition, when a loaded pallet is properly positioned on chains 25 limit switches 28 and 29 are actuated by the pallet. Actuation of limit switch 29 energizes solenoid 279 to supply air to actuate the hose brake and prevents rotation of rollers in the loaded pallet infeed conveyor 1. Closure of limit switch 28 energizes relay 280 the contacts of which condition the circuitry to operate the unloader to lift the load from the pallet and transfer it to a position over the unloading platform 5. Energization of relay 280 opens the normally closed contacts in the circuit of relay 281 and closes the contacts in the circuit of the solenoid 282 actuating valve 275 controlling the hydraulic cylinder 59 for moving the straddle car. Inasmuch as limit switch 80 is closed by the position of the hoist carriage in its uppermost location and contacts of relay 280 are closed so the solenoid 282 shifts the valve 275 to supply hydraulic fluid to the cylinder 59 in a direction to move the straddle car forward toward the loaded pallet so the clamping jaws move along the sides of the second layer of cartons on the pallet. When the straddle car reaches its outmost position with the clamping jaws positioned opposite the sides of the loaded pallets limit switch 64 is actuated by striker 63 to close its contacts in circuit with relay 283 to energize that relay and close the contacts in circuit with the solenoid 284 controlling valve 109 actuating the hydraulic cylinder for the hoist. With the clamping jaws open, the pressure switch 285 is not actuated and its normally closed contacts 286 complete a circuit through the closed contacts of energized relay 287 to energize the solenoid 284 and shift the valve 109 to supply fluid to cylinder 71 in a direction to move the hoist carriage 69 downwardly to its lowermost position where striker 81 engages limit switch 82 to close the contacts of the limit switch acting through the closed contacts of relay 280 and energize the solenoid 288 in a direction to shift the valve 108 to supply hydraulic fluid to cylinders 88 and 94 and move the clamping jaws toward their closed position until they engage sides of the lowermost layer of cartons on the pallet and apply sufficient pressure to actuate pressure switch 285 opening the contacts in the circuit of the down solenoid control for the hoist and closing the contacts to energize relay 289 which closes the contacts operating through closed contacts of relay 280 and shift the solenoid 284 to supply hydraulic fluid to cylinder 71 in a direction to move the hoist upward. When the hoist reaches its upper position limit switch 80 is actuated by striker 79 to close its contacts and act through closed contacts of relay 280 and relay 289, as well as normally closed contacts of relay 290, to energize solenoid 282 to shift valve 275 and supply hydraulic fluid to cylinder 59 in a direction to move the straddle car toward its retracted position over the stacking platform 5. When the straddle car reaches its retracted position limit switch 66 is actuated to open the normally closed contacts in the circuit of relay 286 and close the contacts to energize relay 281. As the straddle car approaches the unstacking platform, fingers 37 are in their raised position with the contacts of limit switches 50, 52 and 54 closed so that energization of relay 281 closes the contacts in the circuit of solenoid 284 to shift the valve 109 and supply hydraulic fluid to move the carriage of the hoist downwardly until it reaches its lower position where striker 81 actuates limit switch 82 to close the contacts acting through the closed contacts of relay 281 and energize solenoid 288 to shift valve 108 in a direction to supply hydraulic fluid to cylinders 88 and 94 and open the jaws 84, 85 of the clamp. When the jaws are retracted limit switch 92 is actuated by striker 91 to close the contacts and energize relay 287 which closes the contacts of that relay in circuit with the closed contacts of relay 281 and energizes solenoid 284 to shift valve 109 and supply hydraulic fluid in a direction to cause hydraulic cylinder 71 to move the carriage on the hoist upwardly. When the hoist reaches its upper position it actuates limit switch 80 closing the contact acting through the closed contacts of relay 281 to energize solenoid 288 in a direction to shift valve 108 and supply hydraulic fluid to the cylinders 88 and 94 and move jaws 84 and 85 of the clamp toward their closed position. As the pressure builds up in the hydraulic system, pressure switch 285 is actuated to close its contacts 290 in circuit with relay 289, closing its contacts which actuate, through the closed contacts of energized relay 281, and the closed contacts of relay 290 (which is already energized as will be explained) to energize solenoid 291 a direction to shift valve 276 and supply fluid to cylinder 45 to lower support fingers 37 under the first row of cartons in the layer resting on the unstacking platform. These cartons are lowered onto the power driven rollers 30 which transfers them as illustrated in FIG. 13B onto the transversely moving power off-bearing conveyor 6 which turns the cartons and moves them in a line toward other apparatus. Energization of relay 287 also closes contacts acting through the closed contacts of relay 281 to lock a mechanical locking solenoid relay 290 which retains the carriage of the hoist in its upper position until the relay 290 is un locked as will be later described. As the support fingers 37 lower the cartons in the first row onto the power driven rollers, limit switch 50 is deactuated so its normally closed contact is again closed and energizes time delay relay 292 which, after time sufficient to permit the cartons in the first row to clear, closes its contacts and energizes solenoid 293 to shift valve 277 in a direction to move the piston in cylinder 46 to lower support fingers 37 of the load supporting platform under the second row of articles and lower them onto the rollers 30. These articles are likewise then moved onto the transverse discharge conveyor where they are turned as illustrated in FIG. 13C. As the support fingers 37 are lowered limit switch 52 is deactuated so its normally closed contact is again closed to energize time delay relay 294 which, after a time, permitting clearance of the second row of articles, closes its contacts to energize solenoid 295 to shift valve 278 and supply hydraulic fluid to the third hydraulic cylinder 47 which lowers fingers under the last row of articles and causes them to be discharged by the power rollers of the load unstacking platform onto the discharge conveyer where they are turned and discharged as illustrated in FIG. 13D. This deactuates from a switch 54 which causes the contacts to return to their normally closed position and energize time delay relay 296 which after a time permits clearance of all the articles, closes its contacts to unlock the locking relay 290 and also opens the normally closed contacts in the load support finger control circuit and energizes each of the solenoids 291, 293 and 295 to shift the valves 275, 276, and 277 and cause the hydraulic cylinders 45, 46, and 47 to move all supporting fingers to their upper position where the limit switches 50, 52, 54 are each actuated and the normally closed contacts are opened deenergizing the time delay relays 292, 294 and 296.

When the limit switches 50, 52, and 54 are actuated their contacts are closed and the relay 290 de-energized so its normally closed contact is closed and energized relay 281 causes the solenoid 284 to shift valve 109 to supply hydraulic fluid to lower the carriage of the hoist and deposit another layer of articles on the load supporting platform. As before, when the hoist reaches its lower position, limit switch 282 is closed to cause the jaws of the clamp to open which actuates limit switch 92 to energize relay 287, closing its contacts and acting through the closed contacts of energized relay 281 to actuate solenoid 284 and raise the hoist. Closure of the contacts in limit switch 80 energizes solenoid 288 to cause the jaws of the clamp to close against the second layer of articles until the pressure builds to a point to actuate pressure switch 285 energizing relay 289 and, following the same cycle previously described, to deposit the bottom layer, row-by-row, onto the rollers and move them in single line along the discharge conveyor. This continues until the last layer of articles has been deposited on the unstacking platform and the carriage of the hoist moves upward to actuate limit switch 80 causing the jaws to move toward their closed position. In the absence of a layer of articles to be engaged by the jaws of the clamping mechanism, the jaws continue toward each other until limit switch 93 is actuated. This closes the contacts of limit switch 93, energizing relay 297. When relay 297 is energized, its normally closed contacts in the circuit of relay 281 are opened de-energizing relay 281. Inasmuch as relay 280 is already de-energized by reason of the actuation of limit switch 66 to open its normally closed contacts, the straddle car and hoist will remain in the retracted position with the hoist carriage in its upper position and the clamping jaws open. This condition will persist as long as a pallet with a load of cartons does not move onto the loaded pallet receiving platform. When a loaded pallet is positioned on the loaded pallet receiving platform limit switch 28 is actuated and its normally closed contacts are opened to de-energize relay 298. With relays 299 and 281 de-energized, their normally closed contacts are effective upon closure of the contacts of limit switch 28 to energize relay 280 and initiate the load pick-up cycle previously described to move the straddle car forward until it engages limit switch 82 which causes the clamps to close on the bottom layer. When sufficient pressure is exerted the pressure switch 285 energizes relay 289 which causes the hoist to move upward so it engages limit switch 80 whereupon the straddle car is retracted to engage limit switch 66. During the retraction step limit switch 65 is actuated, energizing relay 299 to initiate the operation of the pallet handling mechanism to transfer the empty pallets to the magazine.

When all of the layers have been deposited upon the supporting fingers and transferred row-by-row to the discharge conveyer, the clamping jaws elevate as previously described and move to their fully closed position without actuating the pressure switch. When they reach their fully closed position limit switch 93 is actuated to indicate to the control circuit that the load has been completely unstacked. At this time, if another loaded pallet is not positioned on the receiving platform, limit switch 28 is not actuated so relay 298 will be energized, relays 299, 280 and 283 will all be de-energized. This causes the unloader to assume its rest position where the jaws are open, the lift is raised, and the straddle car is retracted. The apparatus will remain in this condition until a loaded pallet moves onto the loaded pallet receiving platform and actuates limit switch 28 to initiate another cycle of operation.

A manually operated switch 300 is connected in shunt with solenoids 291, 293 and 295 so that the fingers 37 may be raised or lowered out of the normal sequence when desired. Also, a manually operated switch 301 is provided to override the normal circuitry to raise or lower the hoist, and switch 302 is similiarly provided to open or close the clamping jaws 84, 85.

A manually actuated switch 350 is provided to control the energization of relay 351 having contacts 352 in the phase lines of electric motor 354 which is employed to drive a pump 353 for supplying fluid pressure to the hydraulic system of the unloader. Manually actuated switch 355 is connected in parallel with switch 350 for controlling the energization of relay 356 having contacts 357 in the phase lines of motor 31 for controlling the operation of the motor. Similarly, motor 26 is controlled by relay 359 having contacts 360 in the phase lines of motor 26, and motor 106 is controlled by relay 361 having contacts 362 in the phase lines of motor 106.

PALLET DISPENSING MAGAZINE

Operation

Normally a pallet is located on the chains 230 at the bottom of the empty pallet magazine 7 so that limit switch 271 is actuated by the pallet. When the unloader 3 removes a stack of articles from a pallet resting on chains 118, the straddle car 4 returns to its retracted position and, during this movement, striker 63 actuates limit switch 65 to energize relay 299 and close its contacts in circuit with the normally closed contacts of de-energized relay 305 to energize relay 306. With limit switch 271 closed by a pallet on the chains 230 so that relay 310 is energized, the closing of limit switch 65 on the unloader energizes relay 299 in circuit with the normally closed contacts of relay 305 to energize relay 306 and time delay relay 307. Assuming that the storage shaft 225 is not filled to capacity so that the normally closed contacts of switch 273 are closed, and with limit switch 266 being closed by the striker 270, to actuate solenoid 308 to direct fluid to the fluid cylinder 254 of the magazine lifting mechanism. Actuation of fluid cylinder 254 to raise the pallet engaging arms 244 will cause rotation of shaft 249 to cause striker 264 to actuate limit switch 262 which will energize solenoid 309 to direct fluid to cylinders 242 to swing the fingers 236 out of the storage shaft. Further movement of the cylinder will subsequently cause striker 264 to actuate limit switch 263 to actuate solenoid 309 to direct fluid to the other end of cylinders 242 to move the support fingers in to support the pallet. Continued movement of the hoist upward causes striker 270 to actuate limit switch 269 to close its normally open contacts to reverse colenoid 308 to direct fluid to the fluid cylinder 254 to lower the hoist. The hoist 67 will continue to move downward until it reaches its fully lowered position with limit switches 266 and 261 actuated by strikers 270 and 264 respectively. With relay 306 energized in circuit with the normally closed contacts of relay 310, and with limit switch 261 actuated, relay 311 will be energized in circuit with relay 380 having contacts 381 in the phase line of the electric motor 233 to provide current to rotor 233 driving the chain conveyer of the magazine and, since limit switch 65 has been actuated by the straddle car, the chain conveyer of the unloader can now start to transfer the empty pallet from the unloader onto the chain conveyor of the magazine. When the pallet is in position in the magazine, limit switch 271 will be actuated to open the normally closed contact of relay 310 to interrupt the current to motor 233 and stop chains 230. Also, movement of the pallet from the unloader will release limit switch 29 to de-energize solenoid 279 to release the hose brake on conveyor 1 to permit another loaded pallet to move into position on the unloader.

Assuming now that there is no empty pallet sitting on the chain of magazine 7, and an empty pallet is in position on the chain conveyer of unloader 3 so that limit switch 65 has been actuated to energize relay 299. With limit switches 266 and 261 both actuated, relays 306 and 311 will be energized, and the chains 230 and 25 will be driven to transfer the empty pallet directly from the pallet unloader to the pallet magazine. When the pallet is in position on the chains 230 of the magazine with the hoist in its lowered position so that limit switch 266, 271, and 261 are actuated, if there is no pallet on the chains 118 of the pallet loader 8 limit switch 123 is not actuated so that its normally closed contacts are closed in circuit with the closed contacts of limit switch 124 which has been actuated by a loaded pallet moving from the chains 118 of loader 8 so that relay 312 will be energized. With limit switch 271 actuated, and with relays 305 and 310 energized, the motor 233 will be driven to move the pallet from the magazine onto the chain 118 of the loader.

Assuming that there is no pallet on the chains 230 of the magazine, so that limit switch 271 is not actuated and a demand for a pallet is received from the pallet loader by the actuation of limit switches 123 and 124 to energize relay 312 and thereby energize relay 306, as described above, and assuming further that there is a pallet supported in the magazine on the support fingers 236 so that the normally open contacts of limit switch 272 are closed, the circuit will be completed through the normally closed contacts of relay 310 and relay 305 and through the closed contacts of limit switch 266 to actuate solenoid 308 to direct fluid pressure to the fluid cylinder 254 of the magazine to lift the hoist mechanism. Lifting of the hoist to its fully elevated position will cause striker 270 to actuate limit switch 260, thereby reversing the flow of pressure fluid to the cylinder 254 and commence to lower the hoist. Lowering of the hoist will cause striker 270 to first actuate limit switch 268 to close its contacts in circuit with solenoid 313 to direct fluid to cylinders 242 to turn the pallet support fingers 236 out, thereby permitting the pallet stack to be lowered with the storage shaft 225. Further lowering of the hoist will cause striker 270 to actuate limit switch 267 to actuate solenoid 313 to direct fluid to cylinders 242 to turn the support fingers in to engage and support the pallet next above the bottom pallet while permitting the bottom pallet to be lowered on arms 244. Further lowering of the hoist to the completed retracted position will cause limit switch 271 to be actuated by the pallet and limit switches 261 and 266 to be actuated by strikers 264 and 270. Since relay 312 is energized as described above, the pallet will then be discharged to the loader.

It is noted that, when a pallet is demanded by the loader by the actuation of limit switches 123 and 124, when there is no pallet in position on the chain 230 of the magazine so that limit switch 271 is not actuated, an empty pallet cannot be discharged by the pallet unloader if the magazine has commenced the cycle to lower a pallet from the storage position since limit switches 261, 266 and 271 would not be actuated. Once the lifting mechanism has completed its cycle the switches would be closed and the empty pallet can be discharged as described above from the magazine and from the unloader into the magazine.

If desired, limit switch 272 and 273 may be connected to a signaling device such as a horn 213 to signal when the storage shaft of the magazine is either empty or filled to capacity. When this occurs, an attendant may add or remove pallets as required through the open side 226 of the magazine.

If desired, a manual switch 314 may be provided to shunt relay 311 to provide manual control of motor 233.

PALLET LOADER

Operation

At the beginning of a normal cycle, the pallet loader has its straddle car 14 in the retracted or stacking position with the hoist carriage 140 raised and the clamping jaws 162, 163 open. In this condition the striker 139 on the straddle car actuates limit switch 137, the raised position of the hoist carriage actuates limit switch 187 which in turn energizes relay 320. In their open position the clamping jaws actuate limit switch 185 which energizes relay 321 and completes the circuit to energize relay 322 because limit switch 137 is already closed. Energization of relay 322 establishes a condition on the control circuitry of the machine to form a pallet load to be ultimately transferred onto a pallet positioned on the receiving platform 15.

Cartons proceeding in single file along infeed conveyer 10 move onto the rollers of a pivotally mounted row-forming platform 11 as long as the platform is in its lowered position. The leading carton engages stop 205 so the leading carton rests upon limit switch 208 and the next two succeeding cartons rest upon limit switches 209 and 210, respectively. When all three limit switches are thus actuated, their contacts are closed and the solenoid 323 is energized to shift valve 324 in a direction to supply pressure fluid to cylinder 199 and elevate the free end of row-forming platform 11, thereby raising the plane of the rollers 202 and end roller 207 above the upper edge of stop 205 so that the three cartons on the row-forming platform are moved along the rollers until the leading carton engages abutment 206 at the end of the row-forming platform and actuates limit switch 211 to close its contacts in circuit with solenoid 323 to condition valve 324 to supply pressure fluid in a direction to lower the piston in cylinder 199 and thereby lower the row-forming platform to its original position as shown in FIG. 21. This lowers the cartons now located at the end of the row-forming platform onto chains 213 which engage the bottom of the cartons while the plane of the rollers 202 move beneath the chains. Thus, the chains, being driven by reason of energization of relay 320, while the carriage of the hoist is in its upper position closing the contacts of limit switch 187 to complete the circuit to the motor 218, transfers the row of cartons transversely until the row engages stop 220 and the cartons are resting on limit switch 221. During the interval, and while the row-forming platform is elevated, succeeding cartons moving on in-feed conveyer 198 have engaged the raised end roller 207 of the platform and are accumulated on the infeed conveyer. When the platform lowers, the first three cartons move onto the rollers of the row-forming platform where they are held by stop 205 in position on limit switches 208, 209, and 210. When the three cartons are thus located, the row-forming platform is raised as previously described so the cartons move over the upper edge of the stop 205 into position above the transfer chains 213. Actuation of limit switch 214 causes the row-forming platform to be lowered and the row of cartons engaged by chains 213 to be transferred onto the layer forming area beneath the hoist. This second row actuates limit switch 222 and, when properly positioned against the prior row, clears limit switch 223 so it returns to its normal position. With limit switches 221 and 222 actuated their contacts are closed and with limit switch 223 released its contact returns to its normally closed position to complete a circuit through the closed contacts of energized relays 320 and 322 to energize relay 325. With the clamping jaws 162, 163 open, limit switch 223 is actuated to energize relay 321 so the energization of relay 325 closes its contacts to complete a circuit through the closed contacts of energized relay 321 and energize solenoid 326 to condition valve 327 in a direction to supply pressure fluid to cylinder 145 and lower the carriage of the hoist until the carriage actuates limit switch 188 upon reaching its lowermost position. Actuation of limit switch 188 closes its contact to complete a circuit to the closed contacts of energized relay 322 to energize solenoid 328 to condition valve 329 to supply fluid to pressure cylinders 165 and 169 to close the jaws onto the layer of cartons resting on the chains 213. As the jaws are closed, pressure builds up in the hydraulic system to actuate pressure switch 330. As the carriage of the hoist leaves its uppermost position limit switch 187 is opened to de-energize relay 320 and limit switch 188 is actuated when the carriage reaches its lowermost position to open the normally closed contacts and de-energize relay 325. In this condition the normally closed contacts of de-energized relays 320 and 325 complete a circuit through the pressure switch 330 to relay 331 to complete a circuit through the normally closed contacts of de-energized relay 325 and the closed contacts of energized relay 322 to energize solenoid 326 and shift valve 327 in a direction to supply pressure fluid to a cylinder 145 and elevate the carriage of the hoist until it engages limit switch 187 to again energize relay 320. As soon as two more rows are formed into a layer on the chains 213, limit switches 221 and 222 are opened so the circuit to drive the motor 218 for the chains 213 is opened and the motor is stopped. This enables a row of articles to be accumulated on the row-forming platform and lowered onto the chains while the carriage of the hoist is lowering to remove the layer already formed. As soon as the clamp closes and lifts the layer from the chains 213, limit switches 221 and 222 are de-actuated so their normally closed contacts complete the circuit to motor 218 and again start the chains. In this way, the formed row follows into position as the layer is being raised, and as soon as it clears the abutment 206 to release limit switch 211, the row-forming platform with three cartons accumulated on limit switches 208, 209 and 210 is raised to permit those cartons to move into position over the chain and actuate limit switch 211 to lower the platform, rest the cartons on the chains and form the second row of the layer.

At the same time, the hoist carriage with the clamped load is being elevated until it engages limit switch 187 to close the circuit for relay 320 and conditions the system to begin another cycle of the clamps and hoist as soon as a layer is formed on the chains 213 by having articles close limit switches 221 and 222 and pass beyond limit switch 223 so its normally closed contact will complete the circuit to relay 322. Inasmuch as the clamps are carrying a layer of articles, the load overcomes the force of springs 153 which normally elevate crossbeam 144 causing the crossbeam to lower with respect to the hoist carriage and actuate limit switch 157 to close its contacts to energize relay 332. Relay 332 is a time delay relay so its contacts in circuit with the solenoid 326 will be closed after a short time delay, completing the circuit through closed contacts of energized relay 325 (energized as a result of the layer formed on the chains and closing limit switches 221 and 222) to energize solenoid 326 and shift valve 327 in a direction to cause pressure fluid to move the piston in cylinder 145 in a direction to lower the carriage of the hoist. As the carriage lowers, the layer carried between the clamping jaws 162 and 163 comes to rest on the layer supported on the chains 213. This relieves the load from the jaws and permits springs 153 to raise crossbeam 144 and de-actuate limit switch 157 to de-energize relay 332 thereby stopping further downward movement of the carriage because the normally open contacts of relay 332 are opened and the circuit to solenoid 326 is opened to permit a spring 333 in valve 327 to move the valve to a neutral position. As limit switch 157 is de-actuated, relay 332 is de-energized and its normally closed contacts return to their closed position, completing the circuit through closed contacts of energized relays 325 and 322 to energize solenoid 328 and shift valve 329 in a direction to supply pressure fluid to the cylinders 165 and 169, moving the clamping jaws toward their open position. When these jaws reach their open position limit switch 185 is actuated to energize relay 321 closing its contacts to again energize solenoid 326 through the closed contacts of energized relay 325. Energization of solenoid 326 shifts the valve 327 in a direction to continue the downward movement of the carriage until it reaches the lowermost position where limit switch 188 is actuated to close its contacts and complete their circuit through the closed contacts of energized relay 322 to energize solenoid 328 and supply pressure fluid to the cylinders 165 and 169 causing the clamping jaws to move toward their closed position. At the same time, actuation of limit switch 188 opens the holding circuit for relay 325 and opening the circuit for the solenoid 328 (that is the open solenoid for the clamping jaw). As the clamping jaws close on the layer of cartons resting upon chains 213 pressure builds up the hydraulic system until pressure switch 330 is actuated, completing the circuit through the normally closed contacts of de-energized relays 325 and 320 to energize relay 331. The closed contacts of relay 331 complete a circuit through the normally closed contacts of de-energized relay 325 and the closed contacts of de-energized relay 325 and the closed contacts of energized relay 322 to energize solenoid 326 shift valve 327 to supply pressure fluid to cylinder 145 in a direction to elevate the carriage on the hoist. This cycle continues until the apparatus has formed enough layers in the load supported by the clamping jaws that upward movement of the first layer lifted from the chains causes the top layer to engage limit switch 191 to close its contacts then, when the carriage reaches its uppermost position to actuate limit switch 187 to close its contacts to energize relay 320. Closure of the contacts to relay 320 energizes relay 334 which shifts the control circuitry from the previously described condition of a load forming circuit to a condition for a load discharging circuit. Energization of relay 334 opens the normally closed contacts to de-energized relay 322, and closes contacts to complete the circuit through the normally closed contacts of de-energized relay 321 and the closed contacts of energized relay 335 to energize solenoid 336 and shift valve 337 in a direction to supply pressure fluid to cylinder 132 and cause the straddle car to traverse outwardly toward the pallet supported on chains 118. This operation can be effective only if relay 335 is energized and to energize relay 335 it is necessary that a pallet be positioned on chains 118 in the pallet loading area to actuate limit switch 123, and it is also necessary that there be room on the loaded pallet receiving conveyer 16 to accept an additional pallet. This latter condition is detected by limit switches 124, 125, and 126. Should three loaded pallets be located over the limit switches 124, 125 and 126, relay 338 will be de-energized and its contacts open to prevent energization of relay 335.

As the straddle car reaches its outermost position, limit switch 138 is actuated to close its controls in the circuit for solenoid 326, which circuit is completed by reason of the closed contacts of energized relay 332 (limit switch 157 being actuated by the load supported in the clamps), the closed contacts of energized relay 334 (the control circuitry for the apparatus being positioned for the load discharge cycle) and the normally closed contacts of de-energized relay 321 (limit switch 9 being open because the clamping jaws are not in their open position). Energization of solenoid 326 shift valve 327 in a direction to supply pressure fluid to cylinder 145 to cause the carriage and hoist to lower until the bottom layer of articles supported between the clamping elements comes to rest on the pallet on chains 118 to relieve the load and permit springs 153 to raise crossbeam 144 thereby de-actuating the limit switch 157, opening its contacts to the energized relay 332. De-energization of relay 332 opens the circuit for solenoid 326 to permit springs 333 to shift valve 327 to discontinue the downward movement of the hoist carriage. De-energization of relay 332 causes its normally closed contacts to return to their closed position, after a time delay, thereby completing the circuit through the closed contacts and energized relay 334 to solenoid 328 shifting valve 329 to supply pressure fluid to cylinders 165 and 169 causing the clamping jaws to move toward their open position. When the clamping jaws are open, limit switch 185 is actuated to close its contacts to energize relay 321 closing its contacts in circuit with the closed contacts of energized relay 334 and the normally closed contacts of de-energized relay 325. This completes the circuit to energize solenoid 326 to shift valve 327 in a direction to supply pressure fluid to cylinder 145 and cause the piston in that cylinder to raise the hoist carriage upwardly until striker 189 engages limit switch 187, at which point the contacts of switch 187 are closed and relay 320 is energized. Energization of relay 320 closes its contacts, completing the circuit through the closed contacts of energized relays 321 and 334 to energize solenoid 336 and shift valve 337 in a direction to supply pressure fluid to cylinder 132 causing the straddle car to return toward its loading position over the layer forming area of chains 213. When the straddle car reaches its retracted position, striker 139 actuates limit switch 137 which closes its contacts to complete the circuit through the closed contacts of energized relay 321 to energize relay 322. When the straddle car is depositing the load on the pallet at the pallet receiving area, lowering of the stack de-actuates limit switch 191 to open the circuit for relay 334 and de-energize that relay. Hence, the energization of relay 322 and the de-energization of relay 334 transfers the control circuitry again to the loading condition where it will repeat the cycle of forming rows on the row-forming platform, and transferring them transversely by chains 213 to form layers which in turn are lifted by the clamping jaws and the hoist.

If desired, additional limit switches, such as limit switch 192, may be placed at varying elevations on the hoist of straddle car 14, and a selector switch 340 provided so that the height of the stack formed may be varied by the setting of the selector switch. Also, a manual over-ride switch 341 may be provided in parallel with switches 191 and 192 to discharge less than a full stack when desired.

A manual selector switch 342 may be provided to condition the circuitry for manual control, so that actuation of manual switch 343 will drive the hoist up or down, and switch 344 may be actuated to open or close the clamps. Also, manually actuated switch 345 is provided to control energization of relay 370 having its contacts 371 in the phase line of motor 346 for driving pump 347 to supply fluid under pressure to the loader hydraulic system. Switch 348 is connected in parallel with switch 345 for manually controlling energization of relay 372 having its contacts 373 in the phase line to control motor 204. Similarly, motor 218 is controlled by relay 374 having its contacts 375 in the phase line, and motor 120 is controlled by relay 376 having its contacts 377 in the phase line of motor 120.

Referring to FIGS. 21 through 28, the sequence of forming a stack of articles by the loader is illustrated schematically. In FIG. 21 the straddle car 14 is in its retracted position over the stacking station, and a row consisting of three articles has been formed on the row-forming conveyer 11 and moved beyond the stop 205 into position against stop 206, with the movable end of the conveyer 11 being elevated to prevent further articles from moving onto the row former. FIG. 22 shows the row former lowered to permit a second row of articles to be formed against stop 205, with the first row of articles being moved onto the chains 223 and being transferred by these chains between the clamping arms of the straddle car. In FIG. 23 the first row of articles is in position against stop 220 and the second row of articles, which has been formed on the row forming conveyer 11, is being moved into position against stop 206. In FIG. 24, a layer has been formed and clamped by the clamping arms of the straddle car and another row is in position on the row former to be transferred by chains 213 beneath the first layer. FIG. 25 shows the clamping arms of the straddle car clamping the initial layer which has been formed on the chains, and FIG. 26 shows the initial layer being elevated so that a second layer can be formed thereunder. In FIG. 27 the second layer has been formed beneath the initial layer, and in FIG. 28 the clamping arms have positioned the initial layer on top of the second layer and moved down to engage the second layer to lift it to permit a third layer to be formed thereunder. This cycle is repeated until a stack is formed and the straddle car moves to deposit the formed stack onto an empty pallet.

While we have disclosed a preferred embodiment of our invention, we wish it understood that we do not intend to be limited solely thereto, but that we do intend to cover all embodiments thereof which would be obvious to one skilled in the art, and which come within the spirit and scope of our invention.

What is claimed is:

1. In a material handling system an article accumulation and transfer apparatus comprising an article conveyer for conveying articles in line to an accumulation conveyer, said article conveyer having a row forming section and a transfer section, means for accumulating a row consisting of a predetermined number of articles fed from said article conveyer in said row forming section, means operable upon the accumulation of a row for conveying the row as a unit to said transfer section, means preventing articles moving from said article conveyer onto said row forming section while a row is being conveyed to said transfer section, and means operable upon arrival of the row at said transfer section for transferring the row as a unit from said article conveyer and simultaneously permitting additional articles to be received at said row forming section.

2. An article accumulation and transfer apparatus comprising a driven conveyer having a receiving end for receiving articles from an article conveyer, an article accumulation station on said conveyer adjacent said receiving end, an article transfer station on said conveyer adjacent the end opposite the receiving end, means accumulating a row consisting of a predetermined number of articles at said accumulation station, means operable upon the accumulation of a completed row for preventing additional articles from entering the receiving end and for transferring the row from said accumulation station to said transfer station, and means operable upon arrival of a row of articles at said transfer station for conditioning the conveyer to admit additional articles at said receiving end and simultaneously transferring the row as a unit from the conveyer.

3. An article accumulation and transfer apparatus comprising a driven conveyer having a receiving end for receiving articles fed from an article conveyer, means pivotally mounting the end of said driven conveyer opposite said one end for limited rotation about a horizontal axis, an article accumulation station on said conveyer adjacent said receiving end, an article transfer station on said conveyer adjacent the end opposite said receiving end, means accumulating a row consisting of a predetermined number of articles at said accumulation station, means operable upon accumulation of a row to rotate said driven conveyer about said pivotal mounting to raise said receiving end to prevent further articles from entering said receiving end and to permit the accumulated row to be transferred by said driven conveyer to said transfer station, means operable upon arrival of the row of articles at said transfer station for rotating said driven conveyer about said pivotal mounting in a direction to lower said receiving end to permit additional articles to enter said receiving end and to simultaneously lower the row of articles onto a second driven conveyer to transfer the row as a unit from the conveyer.

4. The article accumulating and transfer apparatus as defined in claim 2 wherein said means for transferring the row as a unit from said driven conveyer comprises a transfer conveyer, and means for transferring said row of articles from said driven conveyer to said transfer conveyer.

5. The article accumulation and transfer apparatus defined in claim 4 wherein the conveyer paths defined by said driven conveyer and by said transfer conveyer normally extend in vertically spaced relation to one another, and wherein said means for transferring said row of articles from said driven conveyer to said transfer conveyer includes mounting means supporting one of said conveyers for limited vertical movement relative to the other said conveyers.

6. The article accumulation and transfer apparatus as defined in claim 5 wherein said mounting means comprises means mounting said one of said conveyers for limited pivotal movement about a substantially horizontal axis, said means operable upon arrival of a row of articles at said transfer station including means for moving said one conveyer about said substantially horizontal axis.

7. An article accumulation and transfer apparatus as defined in claim 4 wherein said driven conveyer is supported for limited vertical movement between a raised position wherein the conveyer path defined thereby is spaced above the conveyer path defined by said transfer conveyer and a lowered position wherein its conveyer path is spaced below the conveyer path of the said transfer conveyer.

8. The article accumulation and transfer apparatus defined in claim 7 wherein said receiving end of said driven conveyer is spaced above the article conveyer when said driven conveyer is in said raised position to thereby prevent articles from entering said receiving end.

References Cited

UNITED STATES PATENTS 2,790,531 4/1957 McVicker.

EDWARD SROKA, Primary Examiner